(12) United States Patent
Boyd et al.

(10) Patent No.: US 12,444,261 B2
(45) Date of Patent: Oct. 14, 2025

(54) VOTER IDENTIFICATION USING MOBILE IDENTIFICATION CREDENTIAL

(71) Applicant: The Government of the United States of America, as represented by the Secretary of Homeland Security, Washington, DC (US)

(72) Inventors: Daniel A. Boyd, Arlington, VA (US); Kelli L Biegger, McLean, VA (US); Chang Ellison, Arlington, VA (US); Brandon P. Gutierrez, Burke, VA (US); Jason Lim, Alexandria, VA (US); William Washington, North Potomac, MD (US); Arun Vemury, North Bethesda, MD (US); Nathan Grebasch, Fairfax, VA (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 534 days.

(21) Appl. No.: 17/228,274

(22) Filed: Apr. 12, 2021

(65) Prior Publication Data

US 2021/0319642 A1    Oct. 14, 2021

Related U.S. Application Data

(60) Provisional application No. 63/009,728, filed on Apr. 14, 2020.

(51) Int. Cl.
*G07C 13/00* (2006.01)
(52) U.S. Cl.
CPC ................................. *G07C 13/00* (2013.01)

(58) Field of Classification Search
None
See application file for complete search history.

(56) References Cited

U.S. PATENT DOCUMENTS

| 7,849,501 B2 | 12/2010 | Vishik et al. |
| 8,353,016 B1 | 1/2013 | Pravetz et al. |
| (Continued) | | |

FOREIGN PATENT DOCUMENTS

| EP | 3629308 A1 * | 4/2020 | ............. G07C 13/00 |
| WO | WO-2009009788 A1 * | 1/2009 | ............. G06F 21/34 |
| WO | WO-2010151658 A1 * | 12/2010 | ............. G07C 13/00 |

OTHER PUBLICATIONS

Sedky, M. H., "A Secure e-Government's e-Voting System", Science and Information Conference 2015, Jul. 28-20, 2015, London, UK. (Year: 2015).*

(Continued)

*Primary Examiner* — Clay C Lee
(74) *Attorney, Agent, or Firm* — Kelly G. Hyndman; Robert W. Busby

(57) ABSTRACT

In an example, a method includes receiving, by an election office system from a voter device, a request for a voting ballot for an election, part or all of voter ID information associated with a first mobile identification credential which the voter device received from a first authorizing party system (APS), and consented data indication which indicates the part or all of voter ID information that is authorized by the voter device for release by the first APS to the election office system, the part or all of voter ID information to be verified to the election office system by the first APS; and using the verified part or all of voter ID information to verify or not verify an identity of the voter. The identity of the voter is to be verified before the election office system grants the request to provide the voting ballot to the voter.

30 Claims, 13 Drawing Sheets

(56) References Cited

U.S. PATENT DOCUMENTS

| | | |
|---|---|---|
| 9,147,117 B1 | 9/2015 | Madhu et al. |
| 10,503,912 B1 | 12/2019 | Kerr |
| 2003/0138135 A1* | 7/2003 | Chung .................. G07C 13/00 382/119 |
| 2004/0158724 A1* | 8/2004 | Carr .................... G06F 21/6254 713/186 |
| 2007/0079136 A1 | 4/2007 | Vishik et al. |
| 2007/0214357 A1* | 9/2007 | Baldus ................. H04L 63/104 713/157 |
| 2008/0184037 A1* | 7/2008 | Johnson ................ G07C 13/00 713/186 |
| 2012/0144461 A1 | 6/2012 | Rathbun |
| 2014/0020073 A1 | 1/2014 | Ronda et al. |
| 2014/0129255 A1 | 5/2014 | Woodson et al. |
| 2014/0207537 A1* | 7/2014 | Joyce .................... G07C 13/00 705/12 |
| 2016/0055322 A1 | 2/2016 | Thomas |
| 2016/0078581 A1 | 3/2016 | Maher |
| 2017/0032485 A1 | 2/2017 | Vemury |
| 2017/0069151 A1 | 3/2017 | Saravanan |
| 2017/0094514 A1 | 3/2017 | Kelts et al. |
| 2018/0012324 A1* | 1/2018 | Kelts ................... G06Q 30/018 |
| 2018/0165655 A1 | 6/2018 | Marcelle et al. |
| 2019/0036688 A1 | 1/2019 | Wasily et al. |
| 2019/0043148 A1 | 2/2019 | Vemury |
| 2019/0057412 A1 | 2/2019 | Bhattacharjee et al. |
| 2019/0163876 A1 | 5/2019 | Remme et al. |
| 2019/0164165 A1 | 5/2019 | Ithabathula |
| 2019/0213820 A1* | 7/2019 | Sebes .................... G07C 13/00 |
| 2019/0287111 A1 | 9/2019 | Cvetkovich et al. |
| 2020/0034553 A1* | 1/2020 | Kenyon ................ G06F 21/604 |
| 2020/0084039 A1* | 3/2020 | Chabanne ............. G06F 21/123 |
| 2020/0168306 A1 | 5/2020 | Chen et al. |

OTHER PUBLICATIONS

Carnley, P. Renee, et al., "Trusted Digital Identities for Mobile Devices", 2020 IEEE Intl Conf on Dependable, Autonomic and Secure Computing, Intl Conf on Pervasive Intelligence and Computing, Intl Conf on Cloud and Big Data Computing, Intl Conf on Cyber Science and Technology Congress, (DASC/PiCom/CBDCom/CyberSciTech) (pp. 483-490), Aug. 1, 2020.

* cited by examiner

VOTER IDENTIFICATION USING MOBILE IDENTIFICATION CREDENTIAL

CROSS-REFERENCE TO RELATED APPLICATIONS

The application is a nonprovisional of and claims the benefit of priority from U.S. Provisional Patent Application No. 63/009,728, filed on Apr. 14, 2020, entitled VOTER IDENTIFICATION USING MOBILE IDENTIFICATION CREDENTIAL, the disclosure of which is incorporated by reference in its entirety.

STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of verifying the identity and/or eligibility of a voter in an election and, more specifically, to verifications that make use of mobile identification credentials.

BACKGROUND

Verifying voter identity and/or eligibility is an important aspect of conducting an election. Free and fair elections are the foundation of democracy. The integrity of elections at the federal, state, and local levels is paramount to the democratic process and a major concern to those administrating the elections as well as those who cast the votes. Voter fraud and voting irregularities can undermine faith in the election and sow the seeds for negative perceptions.

Heretofore, voters who do not qualify for absentee ballot go to a polling place in person on the day of the election to cast votes and are asked to show proof of identification. Identity verification performed in person is subject to human error and fraud.

SUMMARY

Embodiments of the present disclosure are directed to apparatuses and methods for providing a robust and secure way of verifying the identity and/or eligibility of a voter in an election, by leveraging mobile identification credentials (MIC). In some embodiments, the risk of voter fraud and voting irregularities is reduced relative to physical documentation by virtue of the trust that accompanies MICs. These embodiments establish trust that the voter is properly identified and/or eligible to vote. The experience of the voter is enhanced because he or she can show trusted proof of his or her identity and/or eligibility to vote. While the examples discussed are primarily directed to elections for public office, the similar approaches can be adopted for use in private elections for company officials, surveys, or the like.

Embodiments address establishing voter identity. Moreover, specific embodiments provide verification of voter eligibility in addition to voter identity. The information needed to address voter eligibility depends on the jurisdiction. In addition to age, residency (such as domicile as voting residency) is a factor in determining the eligibility of the voter in a particular state and/or district or locale. Examples of other considerations may include immigration status, citizenship, voter registration, etc. Voter eligibility information is, in various embodiments, part of the MIC and/or provided in a separate database being managed by the election officials. In specific embodiments, voter eligibility is an attribute of the voter's MIC issued by a state authority, such as a driver's license.

Problems can arise when the voter moves. To ensure that the voter does not vote in jurisdictions corresponding to the old and the new addresses, the MIC is a source of residency information that correspond (e.g., match) the residency requirement for the jurisdiction where the voter seeks to vote (e.g., domicile). Updating the voter's residency is made easier by pushing the new information out using the MIC in comparison to a physical document. A residential move within a state can be an attribute of the voter's state ID card. For interstate residential moves, trusted information can be obtained by states communicating with each other to update interstate residential move records. A residency check typically specifies a timeframe prior to the election date in which the user is to be a resident of the jurisdiction in which they seek to vote. There are applications (apps) supported by various organizations (e.g., state or local governments) that implicate residency verification. These tools can be used to update voter rolls prior to voting, such as on election day. Some of the information can be incorporated in the MIC to establish trusted residency and voter eligibility information.

Other embodiments render it feasible to allow voting from a remote location due to the trust that accompanies MIC use. Long lines at polling places on election day can be eliminated or significantly reduced. Voters need not take time off from work in order to vote in person. Adopting such technology may encourage voter participation and instill confidence in the voting process. Furthermore, remote voter identity verification is adopted, in embodiments, for early voting or absentee voting, which provides a rigorous and reliable process to ensure fairness and accuracy in comparison to that previously available.

In embodiments, the voter makes a request to receive a physical ballot. The voter presents a user mobile-identification-credential device (UMD) that includes a MIC, such as a mobile driver's license (mDL), as part of an environment that supports MICs. In such an environment, an Authorizing Party (AP), such as a state department of motor vehicles (DMV) issues the MIC using an Authorizing Party System (APS). The UMD interacts with another device to share some or all of the content of the MIC. The device that is to receive the MIC information (e.g., Relying Party System (RPS)) can be managed by the election office, which is a relying party (RP) that will make use of at least some of the information from the MIC. Upon verifying the identity or eligibility of the voter or user, the RPS provides the voter a ballot. In another embodiment, the request may be made from a remote location via a network. In such cases, a liveness check can be used to ensure the request is made by a person. In this disclosure, "user" and "voter" are used interchangeably to refer to the MIC user as a voter in the voting context.

Another aspect of this disclosure is directed to an election office system that processes a ballot request from a voter device. The election office system in examples is a computing device programmed to receive from the voter device a request for a ballot and send an identification request for at least some identifying information that is included in a MIC. The UMD may obtain the MIC from for example a department of motor vehicles (DMV) or other authorizing party computing system. In response to the request either directly or indirectly, the UMD may electronically communicate at least some of the MIC information based on an input from the user, e.g., consent to send the MIC information. The election office system can verify the MIC information provided by the UMD is genuine, so it reflects MIC information held by the authorizing authority, in this instance the DMV system. When the MIC is genuine and match that of a person authorized to receive a ballot the election office system provides (either directly or indirectly) the voter a ballot. In instances, this can be a physical ballot or an electronic ballot that is communicated to or made accessible from the user's device.

In another aspect, a voter uses his or her computing device to submit an electronic ballot with his/her selections to an electronic office computing system. In embodiments in accordance with this aspect, an election system requests a voter supply identifying information via his or her computing device in response to a request to vote. In response, with user consent the computing device responds with at least some identifying information from a MIC obtained from an authorizing party computing system. Included in or with the identifying information in embodiments is information that is usable by the election system to verify the authenticity of the identifying information to ascertain whether or not it corresponds to information held by the authorizing party in conjunction with the MIC provided to the user device. If the identifying information is genuine and corresponds to a person permitted to cast a vote, the election system permits the user's device to submit a ballot including the voter's selections.

Another aspect of this disclosure is directed to systems for conducting an election in which users can remotely request ballots using their computing devices. In embodiments, the election system and a user's computing system make use of a MIC supplied by trusted third party that supplies it to the user's system. In aspects such as this the use's system is configured to limit the MIC information provided to the election system based on user input to prevent communication of MIC that the user has not authorized for release to the election system. In embodiments, the voter implements his/her device to electronically request a ballot from the election system. In response, the election system requests the voter supply identification (ID) information so the election system can determine whether to provide the user a ballot. Based on user input, the user's device communicates at least some of the information from the MIC. This information can include information that is usable, directly or indirectly, by the election system to validate that the identifying information reflects that which the trusted third party has for the MIC. In examples according to this aspect the user device communicates the selected information either directly or it sends electronic instructions to the trusted party's computing system to send the election system the selected information on behalf of the user/user's device. In instances in which the user device sends the MIC information, the election system can electronically request the trusted third-party system verify the information. This may be done based on instructions provided by the user's system in an electronic response to the election system's request for identifying information. If the MIC information is valid and matches that of an authorized voter, the election office system provides the user a ballot, either electronically or a physical version.

An aspect of the present disclosure is directed to a method for using a voter device to request a ballot from an election office through an election office system. The method includes receiving, by the election office system from the voter device, a request for the voting ballot for the election, part or all of voter identification (ID) information associated with a first mobile identification credential (MIC) which the voter device received from a first authorizing party system (APS), and consented data indication which indicates the part or all of voter ID information that is authorized by the voter device for release by the first APS to the election office system, the part or all of voter ID information to be verified to the election office system by the first APS as verified part or all of voter ID information; and using, by the election office system, the verified part or all of voter ID information associated with the first MIC, to verify or not verify an identity of the voter. The identity of the voter is to be verified before the election office system grants the request to provide the voting ballot to the voter.

Another aspect of this disclosure is directed to an election office system for processing a request for a voting ballot for an election from a voter device of a voter. The election office system comprises a computer programmed to: receive, by the election office system from the voter device, a request for the voting ballot for the election, part or all of voter ID information associated with a first mobile identification credential (MIC) which the voter device received from a first authorizing party system (APS), and consented data indication which indicates the part or all of voter ID information that is authorized by the voter device for release by the first APS to the election office system, the part or all of voter ID information to be verified to the election office system by the first APS as verified part or all of voter ID information; and use, by the election office system, the verified part or all of voter ID information associated with the first MIC to verify or not verify an identity of the voter. The identity of the voter is to be verified before the election office system grants the request to provide the voting ballot to the voter.

Another aspect is directed to a method for a voter having a voter device to submit a completed voting ballot for an election to an election office having an election office system. The method comprises: receiving, by the election office system from the voter device, a request to submit the completed voting ballot for the election, part or all of voter identification (ID) information associated with a first mobile identification credential (MIC) which the voter device received from a first authorizing party system (APS), and consented data indication which indicates the part or all of voter ID information that is authorized by the voter device for release by the first APS to the election office system, the part or all of voter ID information to be verified to the election office system by the first APS as verified part or all of voter ID information; and using, by the election office system, the verified part or all of voter ID information associated with the first MIC, to verify or not verify an identity of the voter. The identity of the voter to be verified before the election office system accepts the completed voting ballot electronically from the voter device.

Yet another aspect is directed to a system for conducting an election in which an election office uses an election office system to process a request for a voting ballot for an election from a voter device of a voter. The election office system includes an election office computer programmed to perform operations according to election office instructions. The voter device includes a voter computer programmed to perform operations according to voter instructions, the voter device having received a first mobile identification credential (MIC) from a first authorizing party system (APS), the first APS including an APS computer programmed to perform operations according to APS instructions. The voter device sends, to the election office system, a request to provide the voting ballot to the voter. The voter device receives, from the voter, consent to release part or all of voter identification (ID) information associated with the first MIC. Either (i) the voter device sends, to the election office system, the consented part or all of voter ID information, and the first APS verifies the part or all of voter ID information associated with the first MIC as verified part or all of voter ID information associated with the first MIC, or (ii) the first APS sends, to the election office system, the consented part or all of voter ID information as verified part or all of voter ID information associated with the first MIC. The election office system uses the verified part or all of voter ID information associated with the first MIC to verify or not verify an identity of the voter. The identity of the voter is to be verified before the election office system grants the request to provide the voting ballot to the voter.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

System Embodiments

Figure 1:
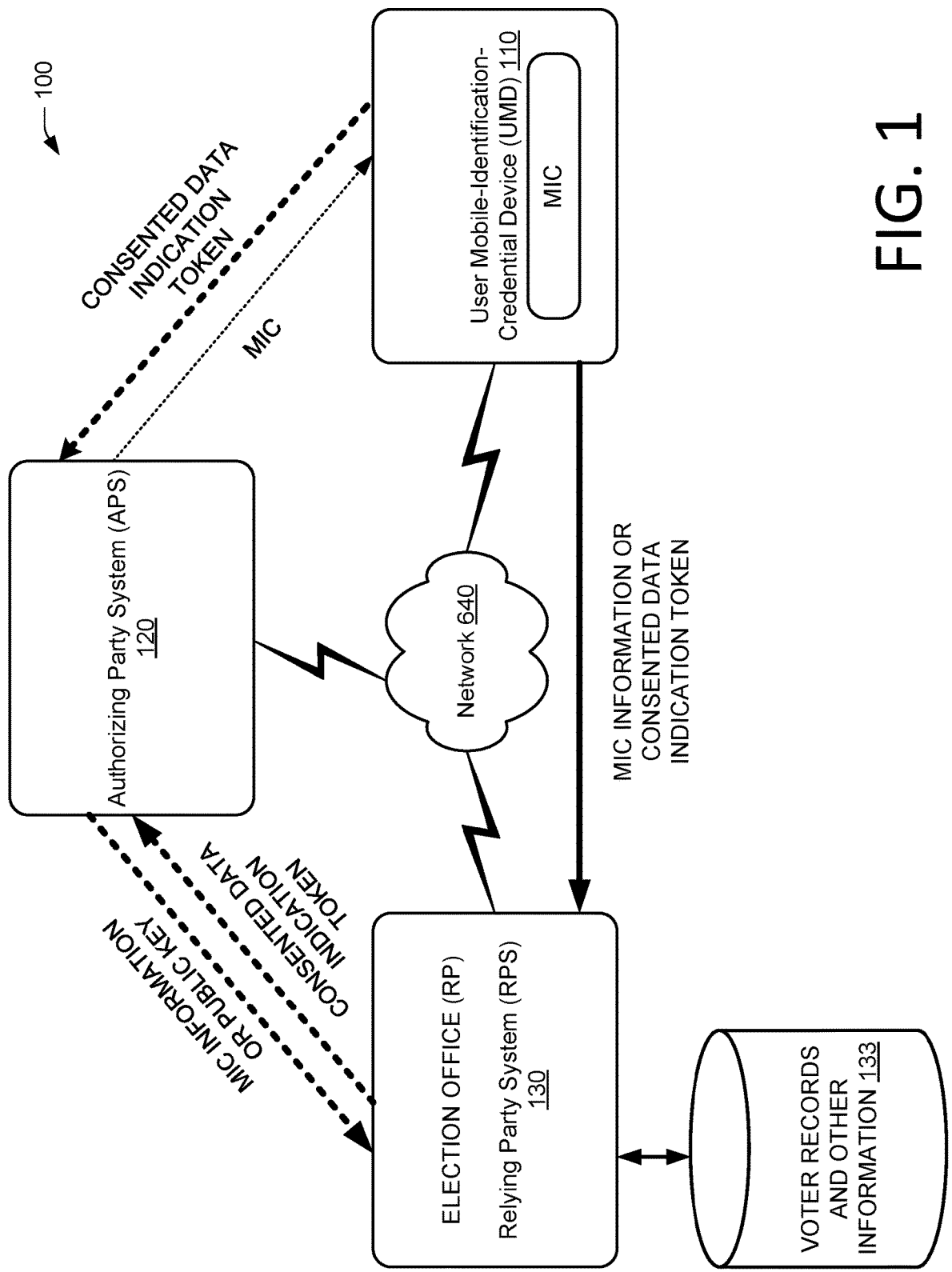
FIG. 1 shows an example of a system employing mobile identification credentials in voting.

FIG. 1 shows example systems 100 employing MICs to verify voters requesting ballots. In an environment that supports its use, a MIC can enable a user to conveniently prove the user's identity. One embodiment of a MIC is a mobile driver's license (mDL) issued by an official agency such as a state Department of Motor Vehicles (DMV). Another embodiment of a MIC is a mobile passport. A mobile passport may, for example, be issued by the U.S. Department of State or a foreign ministry of another nation. The MIC can include various information, such as information relating to identity or privileges pertaining to the user.

The MIC itself may be portable and can be provisioned to devices. Below, the device to which the MIC is provisioned is referred to hereinafter as a User Mobile-Identification-Credential Device (UMD) 110. The term UMD pertains to any device to which a MIC can be provisioned including, without limitation, smart watches, smart fitness bands, smart objects, smart phones, e-readers, tablet computers, smart televisions and displays, smart cameras, laptop computers, desktop computers, servers, kiosks, chips, flash drives, and USB drives.

In an embodiment, the issuer of the MIC (the MIC Issuer) may provision and issue the valid, authentic MIC to the UMD. The MIC issuer may work with a MIC provider to facilitate the provisioning of the MIC to the UMD. The MIC Issuer also may work with a third party to provision the MIC to the UMD. In another embodiment, the user may provision the MIC from one device of the user to another device of the user (e.g., from the desktop computer to the smart fitness band).

A MIC may be validated by an Authorizing Party (AP). In one embodiment, the AP may be an official agency such as a state DMV. In another embodiment, the AP may be a third party empowered by an official agency to perform such verification operations. The AP employs an Authorizing Party System (APS) 120. The APS may provision the MIC to the UMD.

MIC Transactions

MIC transactions can be online or offline. Generally, the UMD 110 may interact or transact with other devices to share some or all of the content of the MIC. The device through which the UMD 110 shares the MIC user information is referred to as a Relying Party System (RPS) 130. The RPS is a system operated by or for a Relying Party (RP). The RPS may obtain MIC user information according to an online mode or an offline mode, based on the RPS's being able to trust the MIC user information and perform verification of the MIC user information, as enabled by the environment in which the MIC is used. In an online mode embodiment, the RPS 130 interacts with the APS 120 to verify the released MIC user information. In an offline mode, the RPS 130 may use a public key from the APS 120 to verify the released MIC user information. Generally, data transfers may be digitally signed, via electronic certificates, to verify authenticity of the data transferred. In addition to or instead of the use of digital signatures, data transfers may be encrypted via public-key cryptography to ensure integrity of the data transfers. Furthermore, data transfers can utilize tokenization to safeguard the online data transfers. Other embodiments rely on combinations of multiple such data protection procedures, as well as other data security best practices.

In some embodiments, secure local or remote connections may be established by using session keys, e.g., based on establishing session-specific encryption protocols. A session key is an encryption and decryption key that is randomly generated to ensure the security of a communications session between parties. A session key can be symmetric, used for encryption and decryption. A session key can be public or private. A session key can be ephemeral. As an example, usage of ephemeral public and private keys is described as follows. At initial engagement, a first device (Device 1) will pass its session public key to a second device (Device 2). Device 2 will use its private key and Device 1's public key to generate Device 2's public key. Device 2's public key is shared with Device 1. These ephemeral key pairs are used to encrypt and to decrypt messages sent between Device 1 and Device 2. A session begins when the two devices acknowledge each other and open a virtual connection, and ends when the two devices have obtained the information they request from one other and send "finished" messages, terminating the connection. Embodiments may make use of such session keys or other practices for establishing secure local or remote connections.

Online MIC Transactions

Online MIC transactions can involve trust and verification. An online MIC transaction may involve a UMD transferring MIC user information in response to a request from an RPS. The RPS verifies whether the received MIC user information is valid based on an online connection between the RPS and the APS. In an embodiment, the RPS may access an electronic certificate from the APS to verify the authenticity of the MIC user information received from the UMD. The UMD may digitally sign the MIC user information using the electronic certificate from the APS. The UMD can retrieve the electronic certificate at the time of the transaction, either from the APS or from a certificate repository. In other embodiments, when something other than a public key is used to verify the MIC user information, the RPS may submit an electronic document or a digital file or the like to the APS in exchange for a key that may be referred to as an authentication key that is not public. The authentication key may be a public key that refreshes after a very short time, such that the RPS reaches out to the APS when it is time to verify the information and uses the public key with a short lifespan before it expires. In other embodiments, cryptography may be based on public/private key pairs.

The RPS or the UMD may perform a liveness check, e.g., by comparing collected biometric information to verified credentials. In an embodiment, an RPS may include a biometric sensor to capture biometric information of the user presenting at the RPS, such as a photograph, a video, a retina scan, a fingerprint, and the like. In another embodiment, the RPS may be configured to request a liveness check from the UMD. Due to the nature of the secure local connection as established through the handshake, the trustworthiness of information from the UMD responsive to the request is preserved. Accordingly, in an embodiment, the UMD may collect and transfer information that the RPS uses to perform the liveness check. For example, the UMD may collect a photograph, fingerprint, and accelerometer information that the RPS uses to determine whether the user's hand motions and/or walking gait are consistent with liveness check information known for the user. In another embodiment, the RPS determines that the UMD is deemed trustworthy for performing its own liveness check, and such UMD liveness determination performed by the UMD is accepted by the RPS. For example, the UMD may be a smartphone performing a facial recognition verification of the user, whose valid result the RPS accepts as verification that the proper user is legitimately in possession of the UMD and presenting the UMD at the RPS.

The interaction between the UMD and the RPS may be in-person, where a user is physically located at the RPS to present the UMD to the RPS. The interaction may be attended, where an attendant or other agent attending the RPS witnesses the transaction, to physically compare the appearance of the user, presenting the UMD at the RPS, against the MIC user information contained on the presented UMD. The interaction between the UMD and the RPS also may be remote, where a user is not physically located at or otherwise physically attending the interaction with RPS. For example, the user may be performing an online transaction using the UMD at home, which remotely transmits MIC user information over a remote connection from the UMD to the RPS located remote from the UMD, e.g., at an online web host.

Online MIC Transactions—Trust

The RPS needs to know, or trust, that the MIC user information obtained from the UMD is unchanged and matches official records. Part of this trustworthiness may be based on how the MIC was securely provisioned or placed onto the UMD, e.g., according to International Organization for Standardization (ISO) standards. Such secure provisioning enables the RPS to trust the MIC and its MIC user information, and also perform verification that such information matches official records pertaining to the person represented in the MIC user information. Trust also may be based on the reputation of the MIC issuer or the APS that provisioned the MIC onto the UMD. Trust further may be based on the trustworthiness of the connection between the RPS and the APS, e.g., based on a connection that is secured by encryption or other technological protections. In an embodiment, trust may be also based on the RPS reputation or other information about the RPS, such as Global Positioning System (GPS) coordinates, as detected by the UMD at the location of the transaction between the UMD and the RPS, matching known coordinates for that RPS.

Tokens can be used to establish trust, by exchanging tokens between the UMD, RPS, and APS. In an embodiment, a token or file may not actually contain requested MIC user information. Rather, the token or file may include a consented data indication to indicate which of the user's MIC user information is authorized for release. The APS can exchange the token or file for the MIC user information that is consented to be released by the APS to the RPS. When a user releases MIC user information from the UMD, the UMD passes an RPS token to the RPS and passes an APS token to the APS. The RPS may communicate via an online connection with the APS, which compares the APS token received from the UMD to the RPS token received from the RPS. Upon verifying a match, the APS provides a copy of the MIC user information to the RPS. Thus, the matching of tokens over an online connection enables the APS to trust the transaction and release the requested information, via an online connection, to the RPS. Tokens similarly enable the UMD or RPS to trust the transaction. In another embodiment, the UMD sends an RPS token to the RPS and sends an APS token to the APS; then, the APS releases the MIC user information only if both the RPS token and the APS token are received and only if within a given timeframe.

Online MIC Transactions—Verification

The RPS can verify that the MIC user information is trustworthy. The MIC, as provisioned onto the UMD including the MIC user information, may be electronically signed in an embodiment, to enable the RPS to verify that the MIC is provisioned to the proper UMD belonging to the proper user. Embodiments may use other or multiple data protection procedures, as well as other data security best practices to verify information, connections, transaction participants, or the like. In the online context, the RPS has an online connection to the APS. The online connection enables the RPS to request and receive information or verification directly from the APS. Accordingly, the RPS can perform online verification of MIC user information received locally from the UMD, by comparing the local information against information at the APS. The RPS also can perform a local verification of MIC user information received remotely from the APS, e.g., using data protection or verification procedures, or other data verification best practices.

Offline MIC Transactions

Trust and verification also play a role in offline, or disconnected, MIC transactions. The offline context refers to a condition when one or all parties in a transaction do not have an online connection to each other or to the Internet. For example, the RPS may be in an isolated location, or may be suffering from a communications failure, and therefore lack an online connection for communicating with the APS. Transactions may still proceed, by virtue of the ability of the RPS and UMD to establish a local connection with each other based on trust and verification. An offline MIC transaction may involve the RPS's verifying whether the received MIC user information is valid, without the RPS's having an online connection, e.g., without communicating to an external system such as the APS that can verify whether MIC user information received by the RPS is trustworthy. In an embodiment, the RPS verifies a cryptographic signature on the individual data elements of the MIC user information using, e.g., signer certificates. This ensures the data is genuine and unchanged, based on the RPS's performing a local verification based on cryptographic operations. In another embodiment, the RPS accesses a copy of an electronic certificate stored locally at the UMD, and periodically refreshes locally stored electronic certificates independently of a given transaction. In some instances, the RPS does not have to submit anything to the APS to obtain a public key for that APS, because the RPS keeps a locally stored copy of that APS key. In an embodiment, the RPS periodically checks with the APS to refresh the locally stored public keys. In some cases, there may be a public key distributor (PKD). The distributor would be an agent acting on behalf of several trusted entities. This agent would hold the most up-to-date public keys and distribute to trusted relying parties such as the RPS. Offline MIC transactions may be in-person, attended, or remote, as explained above in the context of online MIC transactions.

Offline MIC Transactions—Trust

Similar to the online context, the RPS can establish trustworthiness in a MIC and MIC user information for offline MIC transactions. As explained above, the RPS can verify that the MIC was securely provisioned or placed onto the UMD, and therefore trust the MIC and its MIC user information, based on cryptographic operations. Trust also may be based on reputations of systems that provisioned the MIC onto the UMD, and the trustworthiness of connections or the technological protections used between systems involved in transactions.

Offline MIC Transactions—Verification

The RPS can perform a local, offline verification that the MIC user information is trustworthy, without an online connection. For example, the RPS may perform local cryptographic operations to confirm electronic signatures of the MIC and MIC user information obtained from the UMD. In an embodiment, the RPS may use digital signatures or encryption to obtain, locally, verification of MIC user information. Such verification is possible when the RPS receives the MIC user information directly from the UMD instead of the APS, e.g., when the RPS is operating in an offline mode. Thus, the RPS does not contact the APS, but instead uses an offline stored public key of the APS to verify that the MIC user information is trustworthy as received from the UMD.

In the MIC environment presented in FIG. 1, a person presents a UMD 110 that includes MIC as part of an environment that supports MICs. The APS 120 electronically provisions the valid, authentic MIC onto the UMD 110, to ensure confidentiality, integrity, and authenticity of the MIC, or may have a third-party facilitate provisioning of the MIC to the UMD 110. Provisioning can be done in response to user input via the UMD that requests the MIC. This may be done as part of a larger process such as a person obtaining or renewing his/her driver's license. The MIC may be associated with MIC information including biographics, biometrics, and other (such as driving or voting privileges). The MIC may have a compartmentalized structure to enable the user to selectively control and release the information to relying parties. The provisioning of the MIC is done before the request to vote and is thus indicated by a more lightly weighted arrow in FIG. 1.

Figure 3:
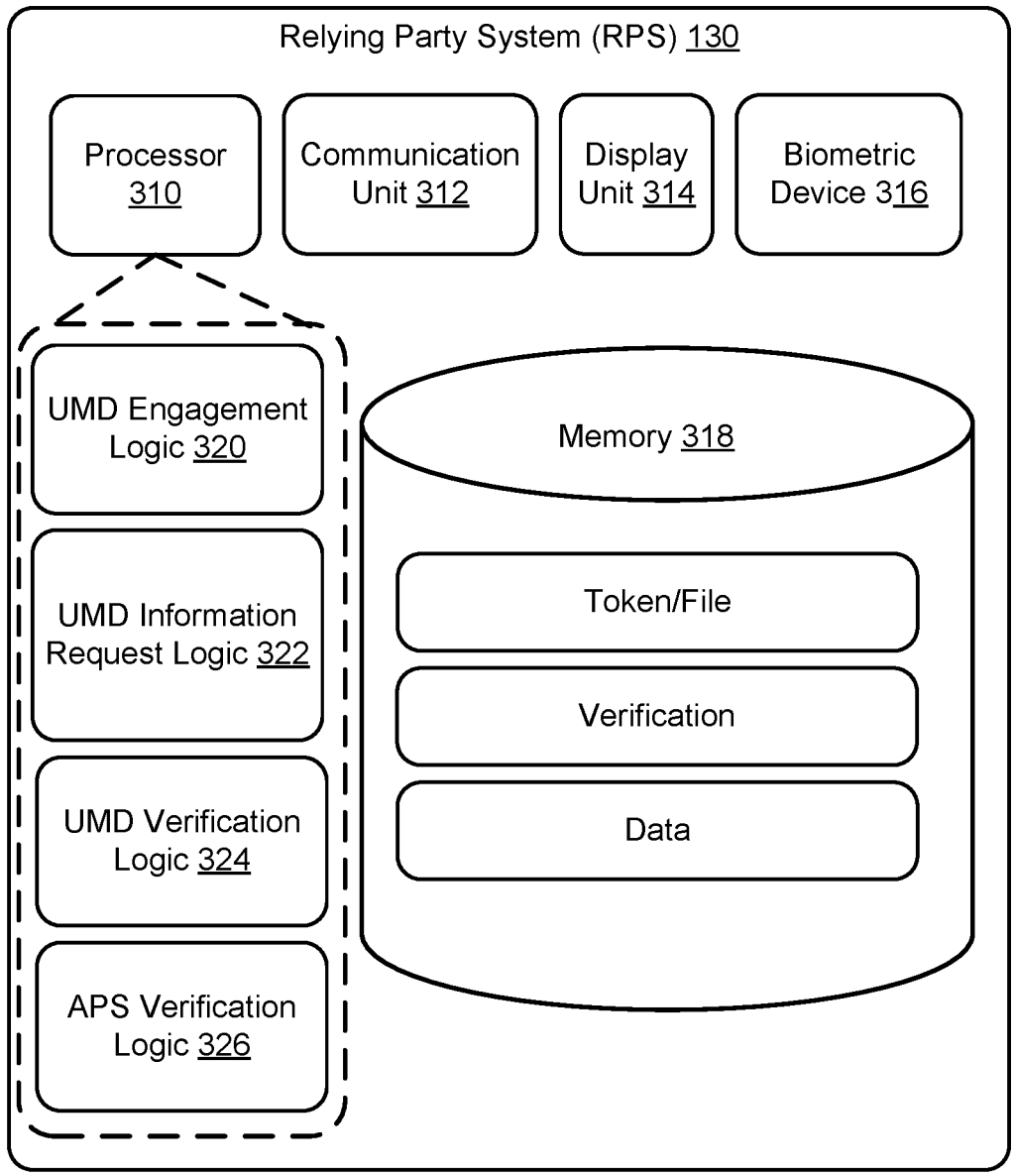
FIG. 3 illustrates a Relying Party System (RPS) according to embodiments.
Figure 4:
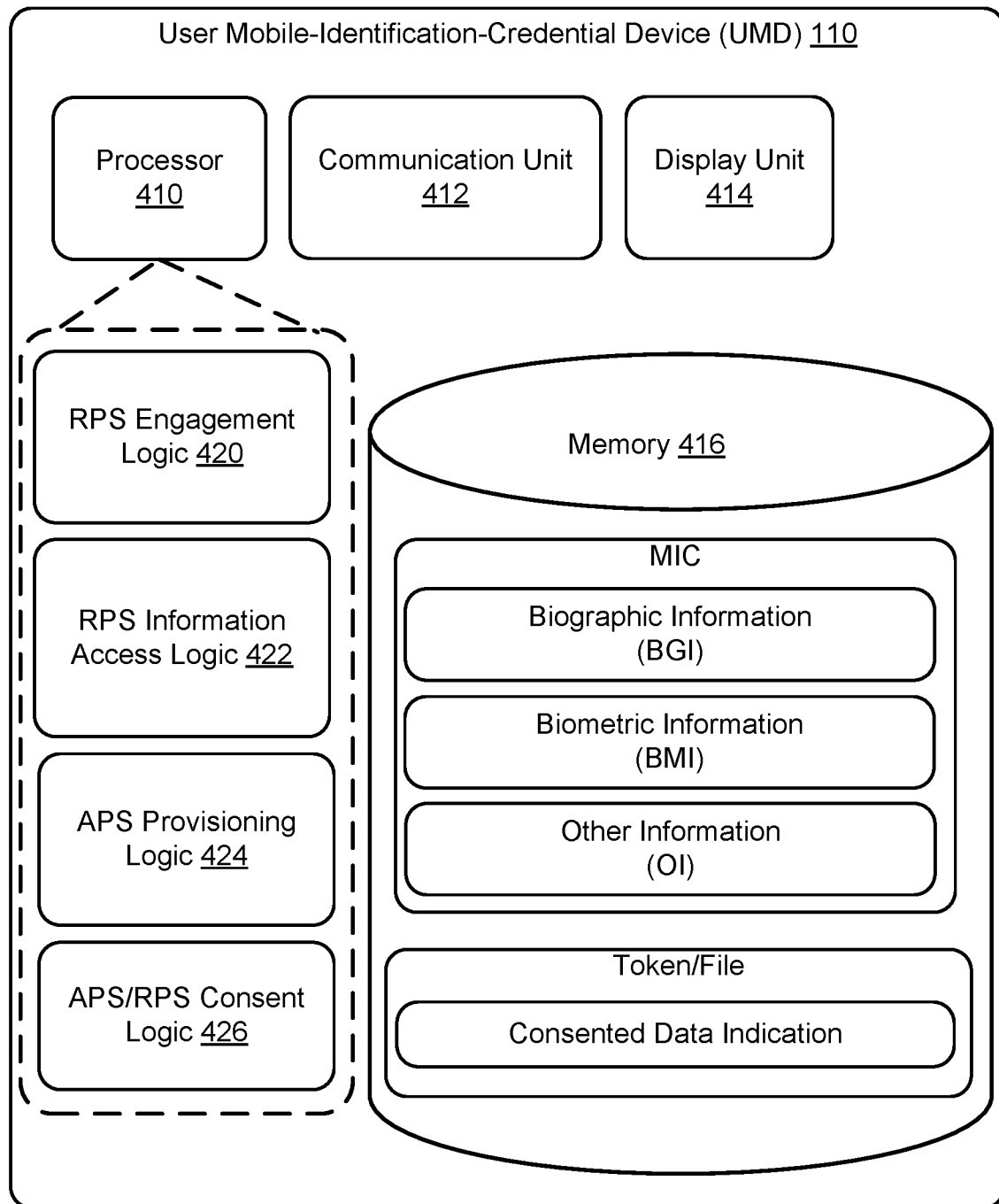
FIG. 4 illustrates a User Mobile-Identification-Credential Device (UMD) according to embodiments.

In the MIC environment presented in FIG. 1, systems operated by relying parties (e.g., an election office) may be configured to accept MIC information from or on behalf of a UMD 110. The UMD 110 electronically interacts (e.g., electronically communicates) with, for example, a Wi-Fi-enabled device to share some or all of the content of the MIC. The Relying Party System (RPS) 130 that is to receive at least some of the MIC information can be maintained by the election office or some organization, which will rely on the MIC information from the UMD. In some embodiments, the relying party has a database 133 of voter records (e.g., voter registration and identity) and other information that generally corresponds to that in MICs for individuals that are registered to vote. Example information includes biographic information (e.g., age, gender, address, driver's license number, etc.) and/or biometric information (e.g., photograph, fingerprint, iris or retina scan, etc.). Database information can be used to verify or to cross-check information from the MIC, for voter verification independent of the MIC, or for record keeping. The network 640 can facilitate communication between the UMD 110, APS 120, and RPS 130. Examples of the network 640 include the Internet and a variety of different wired and wireless networks (e.g., Wi-Fi, BLUETOOTH) and combinations thereof. Example APS 120, RPS 130, and UMD 110 are illustrated in FIGS. 2-4.

Figure 2:
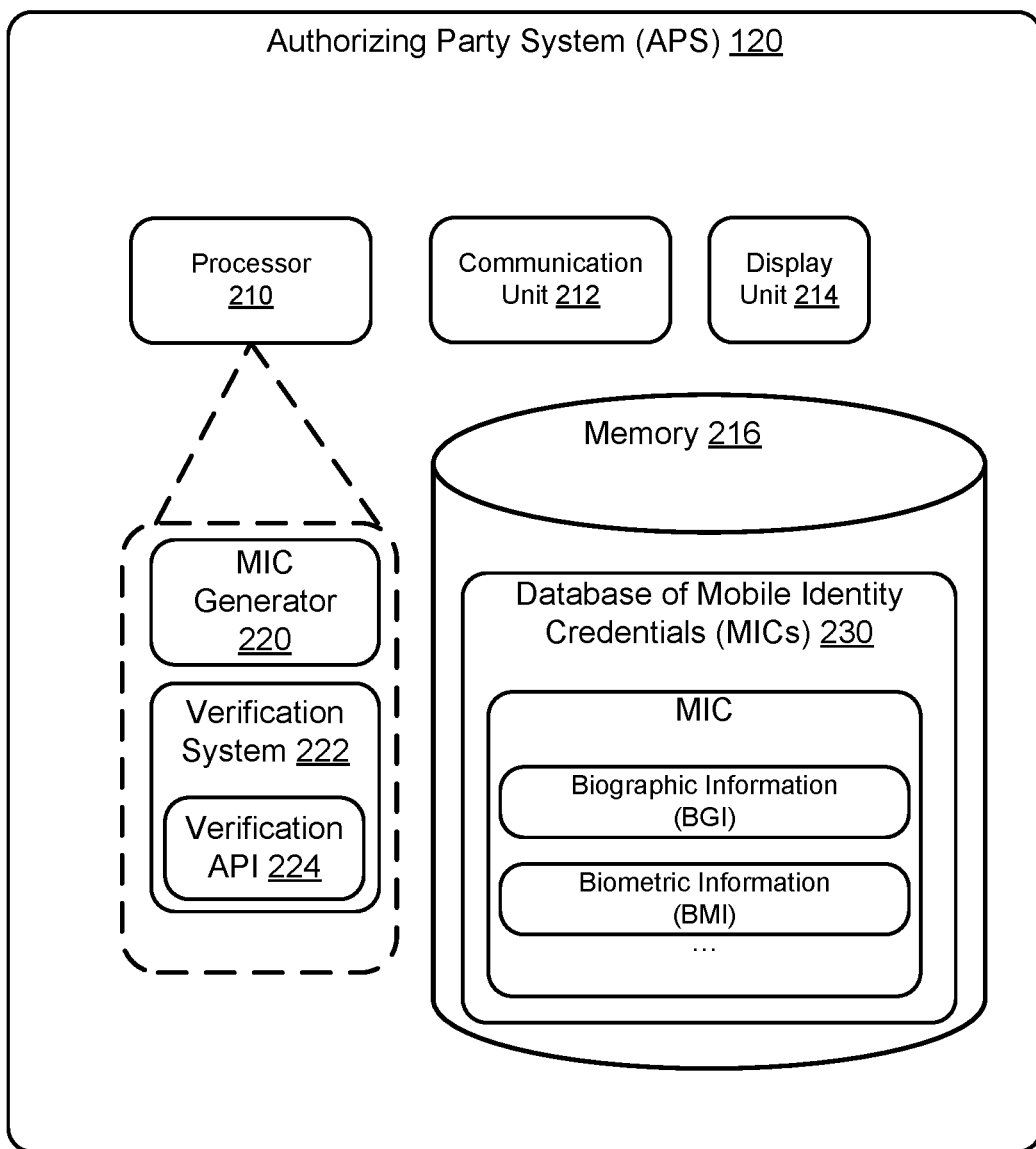
FIG. 2 illustrates an Authorizing Party System (APS) according to embodiments.

FIG. 2 illustrates an Authorizing Party System (APS) 120 according to embodiments. The APS 120 includes a processor 210, a communication unit 212, a display unit 214, and a memory 216. The processor may be associated with logic or modules to process information, including a MIC generator 220 and a verification system 222 with a verification Application Programming Interface (API) 224.

The MIC generator 220 enables the APS to generate a MIC for a given user. For example, the MIC generator receives unique information about the user, such as a social security number. The APS can reside in a local DMV office staffed with agents to verify physical documents in person, who traditionally verify that the social security number belongs to that user. The MIC generator creates a framework to build the MIC for the user and populates the MIC with corresponding biographic and biometric information, e.g., as available locally at the DMV office. MIC information may be stored in APS memory and available for inclusion in a provisioned MIC that is electronically communicated to the users' UMD. In embodiments, an APS may provision multiple different MICs (e.g., a mDL and a mobile voter identification credential) to the UMD, e.g., an APS that provides a mDL and a voter ID. Example information included in other MICs include proof of residency and/or citizenship to establish voter eligibility which is described in greater detail below.

In some embodiments, the MIC generator 220 may populate the MIC with other information corresponding to the user, such as driving privileges or special access. For example, the MIC can be issued or provisioned by the Federal Government, and may include special access, privileges, or MIC user information corresponding to positions at Federal Government agencies. In an example, the APS may be located at the DMV, and an agent of the DMV collects and manually verifies proof of identity that the user provides to the agent in person. In an embodiment, a kiosk at the DMV may perform a liveness check of the user and/or otherwise perform unattended verification of the proof of identity that the user provides to the kiosk.

In another embodiment, the MIC generator 220 facilitates verification of the user's identity attributes against official records available to the DMV and/or physically presented by the user. Facilitated verification can be attended by an agent in person, or unattended and self-performed by the user at a kiosk or other automated system. In an embodiment, such facilitated verification may involve the use of a system such as a kiosk or electronic device with audio or video playback and recording, visual scanning, or other telepresence capabilities, which the user accesses to interact remotely with an agent from the DMV or other APS that is to provision the MIC. Such a system can be located remote from the DMV or other APS facility, at which the agent is located, and can be separate from the UMD. In an embodiment, the system to interact with the agent may be the UMD that is to receive the MIC. Such system allows an agent at the DMV, through telepresence or other audio or visual interfaces of the system, to visually access, inspect, and verify information submitted as proof of identity (e.g., by scanning or photographing a birth certificate or the like). In another embodiment, such facilitated verification may involve the user's accessing a remote kiosk or smartphone app to virtually interact with an agent that facilitates the identity verification, or to interact with a self-guided verification user interface, such as a website or smartphone app.

Generated MICs may be stored in the memory of the APS and available for provisioning onto the UMD of the user. In an embodiment, a given APS provisions multiple different MICs onto the UMD, e.g., at an APS that provides a mDL and some other ID or proof. Examples include proof of escrow fulfillment which is described in greater detail below in connection with an escrow transaction in FIG. 12, a membership ID, a special coupon, a rebate document, a legal document such as a contract, and the like.

Different types of MICs may be associated with corresponding different levels of assurance (such as multi-factor verification) needed to facilitate verification of the user's identity, whether in-person or remote, attended or unattended, or other aspects of the identity verification. Furthermore, in some embodiments, a given MIC environment may be associated with a corresponding trust framework, such as the voting field (or the medical or healthcare field or the transactions field) and a related set of rules pertinent to maintaining security of the voting information (or the medical or healthcare information or the transactions information). The level of assurance for a given MIC environment corresponds to the trust framework. Additionally, in an embodiment, communications with the MIC generator (and other aspects of the MIC environment including the APS, UMD, and RPS and their various modules or logic) may be facilitated and secured by cryptographic modules, e.g., as outlined in the National Institute of Standards and Technology (NIST) requirements and standards for cryptographic modules, the Federal Information Processing Standard (FIPS) publication 201 regarding Personal Identity Verification (PIV) requirements, and the like.

The APS verification system 222 of the APS 120 may be configured to interact with an RPS such as when handling requests for user information from the RPS. In the illustrated embodiment, the APS verification system uses a verification API to interact with the RPS in a standardized computing format.

The verification system 222 of the APS 120 also may be configured to interact with other systems, such as UMDs (to send or receive tokens), back ends, and the like. In an embodiment, the APS verification system may be configured to receive a token from the UMD, and a token from the RPS. The verification system then electronically compares the tokens to determine whether the tokens match within an acceptable timeframe. In an embodiment, matching or otherwise verifying the two tokens indicates that the RPS is trustworthy regarding UMD consent and user information.

Generally, the APS verification system 222 verifies various aspects relating to MIC information. For example, the APS verification system may verify whether a request to release user MIC information is legitimate, and if so, authorize the release of such information. In an embodiment, the APS verification system authorizes release of MIC user information to the requesting RPS. In another embodiment, the APS verification system releases MIC user information to the UMD 110, e.g., when provisioning the MIC onto the UMD. In the illustrated example, the verification system uses a verification application programming interface (API) 224 to communicate with other systems requesting verification and/or MIC information, including RPSs and/or UMDs. In some embodiments, the verification system 222 of the APS 120 may be configured to communicate with other systems, such as other APSs including government entities, trusted certificate holders, open ID providers, back ends, and the like. The APS verification system enables such communications to be secure, ensuring the integrity of such communications.

The memory 216 may be associated with a database of MICs 230. A given MIC may include Biographic Information (BGI) and Biometric Information (BMI), which can be selectively requested and provided, e.g., as MIC user information, when the MIC is provisioned onto a UMD. The MIC also can include other information, such as privileges pertaining to the user.

The MIC generally may be structured to securely and discretely store various fields comprising the BGI, BMI, or other information. For example, the BGI may include first name, last name, date of birth, gender, address, identifier number, organ donor status, and the like. In an example, the BMI may include a digital photograph and/or information derived from a digital photograph of a user, a digital image representing a QR code containing the BGI, a digital fingerprint representation, a digital retina representation, a representation of biometric information (e.g., templatized biometric information) and the like.

The structure of the MIC can enable the other information to be added, such as when provisioning the MIC from the APS to a UMD, or after provisioning the MIC to the UMD, such as when the user enters information into the MIC via the UMD. For example, a user enters supplemental information into the MIC via the UMD, e.g., emergency contact information. Information on the MIC can be compartmentalized and separately accessible.

FIG. 3 illustrates a Relying Party System (RPS) 130 according to an embodiment. The illustrated RPS 130 includes a processor 310, a communication unit 312, a display unit 314, a biometric device 316, and a memory 318. The processor may be associated with logic or modules to process information, including UMD engagement logic 320, UMD information request logic 322, UMD verification logic 324, and APS verification logic 326. Embodiments of the RPS may include hardware (biometric device 316) to collect information to perform a liveness check of the user who is present at the location of the RPS, such as a camera, fingerprint reader, retina reader, and the like.

The biometric device 316 may include one or more biometric readers for obtaining biometric information from users at a physical location affiliated with the RPS 130 (e.g., a department of motor vehicles facility), to be used to match authenticated biometric information in the MIC or otherwise stored in the APS 120 or the RPS 130. Examples include, but are not limited to, a fingerprint reader for fingerprint matching or recognition, a retina scanner for retina matching or recognition, a facial imaging device or camera for facial matching or recognition, and a voice capture device (e.g., microphone) for voice matching or recognition.

The UMD engagement logic 320 in the RPS may be configured to establish a secure local connection with the user's UMD. For example, the UMD engagement logic establishes a key exchange protocol so the RPS can negotiate a key exchange (e.g., an encryption key electronic negotiation) as part of a communication protocol to generate a communication channel between the RPS and the UMD, via radio frequency or visual communications. In an example, the UMD engagement logic encodes a public key in a QR code and displays the QR code to the UMD. Upon reading the QR code, the UMD responds to the RPS with a key exchange to secure a local connection between the RPS and the UMD. In some embodiments, the secure local connection utilizes protocols such as secure near-field, secure Bluetooth, secure Wi-Fi, or the like.

The RPS's UMD information request logic 322 may be configured to enable the RPS to structure a request for consent from the UMD and transmit that request to the UMD via a secure local connection. The request for consent may include a request for the types of user information which the relying party is requested by way of the RPS. For example, the consent request may include a request for the user's date of birth. The request for consent, in embodiments, may include a dialogue in which the user is prompted to answer specific questions, via a user interface, regarding whether the user releases the specific information fields, or a set of fields, to the RPS. In specific embodiments, this dialog is referred to as a release dialog.

The UMD verification logic 324 may be configured to enable the RPS to verify whether user information received from the UMD is valid, as set forth above in connection with online and offline MIC transactions.

The APS verification logic 326 may be configured to enable the RPS to verify whether user information received from the APS is valid. Similar to the online and offline approaches described above, the RPS can access an electronic certificate authorized by the APS, whether stored locally or remotely, to digitally verify information received from the APS that is digitally signed by the certificate used by the APS.

The memory 318 may be associated with a token/file, a verification, and data. The RPS makes use of the tokens/files for trust and verification. The RPS receives the token or file from the UMD and may be configured to pass at least a portion of the token or file to the APS. Thus, the RPS exchanges the token or file at the APS to receive user information. The verification represents a positive confirmation, via the use of electronic signatures or cryptography, that received information (whether from the APS or the UMD), is valid. The data represents the received user information.

FIG. 4 illustrates a UMD 110 according to an embodiment. The UMD includes a processor 410, a communication unit 412, a display unit 414, and a memory 416. The processor may be associated with logic or modules (supported by hardware or software) to process information, including RPS engagement logic 420, RPS information access logic 422, APS provisioning logic 424, and APS or RPS consent logic 426.

In an alternate embodiment, the UMD 110 may include removable memory, such as a Universal Serial Bus (USB) flash memory unit or micro Secure Digital (SD) flash memory card. In such embodiments, the memory of the UMD, which contains a provisioned MIC, may be separable from the UMD and/or combinable with a different UMD. In another embodiment, a memory itself serves as the UMD. In such embodiments, a user carries a portable memory UMD containing the user's MIC and/or user consent tokens/files. Such a portable memory UMD, in embodiments, may be a portable USB flash drive. To conduct a transaction or otherwise provide identification, the user inserts the portable memory into an RPS 130, which interprets the insertion as proximal consent to read the MIC user information (whether directly from the portable memory to the RPS in an offline mode, or indirectly by retrieving a user consent token from the portable memory and forwarding that token to an APS 120 from which the RPS receives MIC user information). In yet another embodiment, the UMD comprises a code, such as an electrically-readable code via magnet, RFID, and the like, or an optically readable code such as barcode, QR code, and the like. In such embodiments, the user conducts a transaction or otherwise provides identification by presenting the code to an RPS including a reader compatible with the code's format. In an embodiment, the RPS may include a keyboard that the user uses to manually type the code. In another embodiment, the RPS may include a card reader to read the code contained in or on a card-format UMD, whether electronically, magnetically, or optically encoded on the card. The RPS reader can verify such identities by using those forms of identity to retrieve biometric information from the APS and performing a comparison with the user to verify that the MIC belongs to that user. In yet another embodiment, the UMD may be a personal identity verification (PIV) card.

The RPS engagement logic 420 may be configured to enable the UMD to establish the secure local connection with the RPS, as set forth above with respect to the description of FIG. 3.

The RPS information access logic 422 may be configured to enable the UMD to allow the RPS to access the MIC user information associated with the MIC (whether stored at the UMD for offline mode access or stored at the APS for online mode access). In the context of allowing access to MIC user information stored on the UMD, passive access involves the UMD enabling the RPS to read data from the UMD. Active access involves the UMD transmitting data to the RPS. Allowing access furthermore may include the UMD authorizing release of MIC user information from the APS to the RPS, which similarly involves passive or active access between the RPS and the APS. The RPS information access logic 422 may be responsive to the UMD information request logic 322, as set forth above with respect to the description of FIG. 3.

As illustrated, the UMD includes RPS information access logic 422 that may be configured so the UMD in response (directly or indirectly, such as after receipt of user input) electronically forwards or pushes the applicable MIC information to the RPS in an offline scenario. In an online scenario, the UMD establishes a communication link with the APS and instruct it to forward the requested information to the RPS as authorized by the UMD. For example, the RPS requests MIC information including information that is "optional" such as driver's license number. In response, the UMD instructs the APS to release the MIC formation without the driver's license information. The foregoing example presumes the UMD user selects not to forward the driver's license number. The user may make this selection manually or by establishing a user profile on his or her UMD that enforces what MIC is communicated directly or on behalf of the UMD, e.g., by the APS. For example, a user may establish a preference in settings that limits communication to be the most limited, e.g., omit "optional" MIC information. It is to be apparent that that user, via the UMD, can implement an Internet enabled third party service (such as one operated by a group that has as one of its goals the protection of privacy) to permit or restrict what information is electronically provided to the RPS by or on behalf of the UMD.

Although driver's license number is referenced, it is to be apparent that other MIC information may be "optional" and in some instances the UMD may be configured, such as via a privacy profile established in settings to default to a comparatively more restrictive privacy. For example, a user may via his/her phone automatically limit what information is provided or requested. For example, though the UMD sends other requested MIC information, it may not send a facial image (presuming this is permitted by the applicable jurisdiction) and instead display the image on a display along with a two-dimensional barcode that is usable by the RPS to verify the image corresponds to the MIC information electronically communicated to the RPS.

Allowing access in some instances may include the UMD authorizing release of MIC information from the APS to the RPS. The foregoing can include instances in which the UMD electronically instructs the APS to communicate less than all or substantially all the information requested by the RPS, e.g., to omit optional information. For example, the APS provisioning logic 424 on the UMD, responsive to the RPS, generates a request for the APS to provide the RPS the requested information. The foregoing presumes the user via the UMD has not limited what is to be provided. In examples, the UMD electronically forwards a request from the RPS to the APS by including at least some information from a preestablished certificate (e.g., UMD-APS certificate) so the APS can verify or authenticate the UMD, via the APS provisioning logic, directed to the RPS.

In embodiments, such as off-line examples, the UMD's APS provisioning logic 424 may be configured to store the MIC securely in UMD memory so it available for communication when released by a user, such as in instances where the APS is unavailable (e.g., offline) or UMD providing the MIC is selected (e.g., user preference).

The UMD's APS provisioning logic 424 can be responsive to the MIC generator as described in connection with FIG. 2. For example, in response to the APS pushing a MIC to the UMD, the UMD prompts the user via a user interface to authorize acceptance and storage of the MIC.

The APS provisioning logic 424 on the UMD communicates with the APS to indicate readiness for provisioning the MIC from the APS onto the UMD. In some embodiments, the APS provisioning logic may be configured to provision multiple MICs onto the UMD. For example, the APS provisioning logic provisions a first MIC corresponding to a mobile Driver's License (mDL), and a second MIC corresponding to some other ID or proof such as, e.g., proof of residency, organ donor information, and/or citizenship to establish voter eligibility. An example of organ donor MIC indicates what organs the user to donate and for what purpose (e.g., transplant, medical research) as well as user biographic information. Implementation of multiple MIC may occur based on a variety of rationales. For example, while the information included in and/or permitted for a mDL may be set by international or interstate agreement, what information is included on another MIC (e.g., organ donation) may be set by an applicable jurisdiction, organization. The UMD can store the MIC in the memory as illustrated, including the various information of the MIC such as the BGI, BMI, and OI.

The UMD includes an APS or RPS consent logic 426 configured to enable the UMD to receive requests for the consent and release of MIC information. The APS/RPS consent logic 426 may be configured to generate, responsive to received requests, corresponding compartmentalized and/or discrete prompts for the voter's consent to selectively indicate approval to release such MIC information. The APS or RPS consent logic may be implemented as a combination of hardware or software as a program of instructions that cause the processor to control what MIC information is provided to the RPS, whether directly or indirectly via the APS on the UMD's behalf. For example, the APS or RPS consent logic supports a graphical user interface that allows users to select what information from MIC is to be communicated base on specific use cases or types of use cases. In an example, the APS or RPS consent logic may be configured to interact with the UMD information request logic 322, as described in connection with FIG. 3.

In embodiments, the APS/RPS consent logic 426 in the UMD receives the user's selective consent and directs the UMD to selectively release the MIC information in accordance with the consent. The foregoing configuration may be set as part of a provisioning process in which a user informs the APS what information to provide or verify based on specific use cases. In another embodiment, the APS or RPS consent logic receives the user's input and electronically instructs the RPS information access logic to release the selected or requested MIC to the RPS based on the user's input. For example, responsive to a user authorizing the UMD to release substantially all the MIC information to a county government PRS, the APS or RPS consent logic instructs the RPS information access logic to communicate substantially all the MIC stored in local memory to the RPS system. The foregoing may be done in response to the user activating a virtual "submit" input button displayed on his/her smartphone or other UMD. Those of skill in the art will appreciate that the APS or RPS consent logic may access memory to obtain the MIC and a token or file. and then pass it to the APS or RPS consent logic for communication to the RPS.

The memory 416 may be associated with at least one MIC and a Token/File. The MIC may include MIC user information such as Biographic Information (BGI), Biometric Information (BMI), and Other Information (OI) such as privileges. In embodiments, the UMD communicates the MIC, including the APS certificate, under control of the APS or RPS consent logic. The token or file can include a consented data indication. In an offline embodiment, the APS or RPS consent logic obtains user consent input and transmits the requested BGI, BMI, and/or OI (e.g., using a secure communication link and a verification protocol to digitally sign the requested information) from the UMD to the RPS. In an online embodiment, the APS/RPS consent logic obtains consent and transmits, to the APS, the token/file (as stored in the memory) which contains a consented data indication. The token/file may not actually contain the requested MIC information. Rather, the token/file may include the consented data indication which indicates which of the user's MIC information is authorized for release by the APS. Such consented data indication may be used by the RPS. The RPS passes the consented data indication to the APS, which exchanges the token/file for the MIC user information that is consented to be released. The APS then releases to the RPS (e.g., allows access by the RPS) the consented MIC user information.

As used herein, a UMD is not required to be mobile. It is meant to encompass stationary devices such as desktop computers and portable devices such as laptop and notebook computers as well as mobile telephones. In a specific embodiment, the requested MIC may be transmitted from the APS to a stationary intermediary device, which serves as the UMD that subsequently transmits the MIC to a user mobile telephone. This is a typical example of a request made from a remote location such as a person's home using the person's computer as the UMD.

Other ways of verifying the identity or eligibility of the voter are possible. In some embodiments, a computer-readable storage medium such as a USB dongle may be used as the source of MIC information. For example, the storage medium may be a removable memory from the UMD. In such scenarios, the RPS can be configured to read the MIC from the user's storage medium and, optionally, receive user input via an interface consenting to the RPS accessing all or part of the MIC information and/or decrypting the stored MIC.

In other embodiments, an RPS receives directly or remotely an electronic key or digital code from a user, that is usable by the RPS to access all or part of the user's MIC stored in a third-party storage medium, such as a cloud system accessible to the RPS. Upon successful verification, the RPS can provide the voter an electronic ballot in a variety of way. Examples include, but are not limited to, via e-mail, or by sending the user (via the UMD or a device provided or supported by the relying party) a limited use hyperlink (e.g., a one-time link) that allows the voter to electronically submit his/her selections.

Having described representative systems, devices, techniques and approaches example processes, methods, techniques and approaches are now described. Those of skill in the art will appreciate that the following discussion can be implemented using the described system, devices, etc. although the described methods are not necessarily restricted to the described physical devices and vice versa. Those of skill in the art will appreciate that the various disclosure and teachings can be combine and rearranged.

In embodiments, remote voting can be accomplished by permitting voters to assert an identity represented in a verifiable credential issued by a trusted authority, such as a state drivers' license register, e.g., state department of motor vehicles (DMV). In this example, a user physical presents documentation to the DMV as part of an enrollment process to verify that they correspond to the identity they profess to be. The DMV acts as an issuing authority for a MIC and in this embodiment and ensures that the person corresponds to the issued credential.

Upon being sufficiently assured that the person is who they assert themselves to be, the DMV (issuing authority) can issue the user a MIC (e.g., a mobile driver's license) that is provisioned to the user's mobile device. The MIC can include various biographic information (name, date of birth, eye color, weight, height, driving status) and biometric information, e.g., a frontal image captured at the time of issuance. The DMV encrypts the MIC with a private key. For example, the DMV may encrypt the information forming one or more MIC (e.g., a mobile driver's license, organ donor identification, etc. based on an applicable scenario) and include respectively a digital certificate that is usable by other parties to verify that that the MIC is valid, e.g., the DMV issued it and the information reflects the information held by the DMV in for example a database or other data structure of driver information. It is to be apparent that the DMV database can include additional information beyond that in the MIC. For example, the database may include information on when the user first obtained a license, whether a previous MIC was issued, and so forth.

Continuing with the above scenarios, the DMV can provision the MIC to a device to the UMD, so it is available to the user. For example, the DMV electronically communicates the information forming the MIC (in encrypted form) along with a digital certificate that contains the public key for the DMV that is included as part of an overall package of data forming the MIC (an overall package is not to be confused with communication data packages used to transfer the MIC overall data package to the UMD via a communication network).

The DMV (likely separate from the described personal transaction) can publish or otherwise makes public its public encryption key, so among other things, third parties are assured that respectively they can ascertain what MIC information was issued by the DMV. In embodiments, the DMV "publishes" (e.g., makes available) such as via the Internet what its MIC "looks like." In this way, other parties such as relying parties are informed of what schema the DMV uses and the information, format for its MIC.

In examples, the DMV may use blockchain technology to assure other parties that the published information is from the DMV. For example, the DMV published information may describe the information forming the MIC and include the DMV public encryption key. This serves as a mechanism for verifying the information and permits the third parties (e.g., relying party) to verify that information supplied via a user (either directly or on its behalf) is genuine to the DMV.

In remote voting embodiments, a user (voter) accesses a portal (e.g., online portal) run by or on behalf of the entity or organization running the election. For example, as part of voting in a county election, a voter may use his or her computing device to access a website that is designed to accept user identification and validate the user identity via a MIC. The portal can also include or be designed to accept the user's vote.

Those of skill in the art will appreciate the portal may implement a variety of approaches for providing the described functionality. For example, the portal may be a secure website, e.g., a website implementing secure hypertext transfer protocol (https)) that encrypts communications over the Internet using transport layer encryption and may make use of digital certificates to permit verification.

In another embodiment, the portal may be supported or provided as part of a virtual private network that extends a private connection across a public network (such as the Internet). This may be accomplished through use of an encrypted layered tunneling protocol, so a remote system (e.g., voter's computing system) can make use of resources (e.g., a voting application) made available by or on the entity's computing system, e.g., a county election board's computer system. Though the foregoing is described as if the county system was a physical device (e.g., a server), the voting capability, including the identity portion can be virtualized in a cloud type manner or provided in a distributed manner. In embodiments, the user's computing device can include an application that facilitates the establishment and/or electronically supplying the users MIC. For example, a state commissioner of elections office makes available an application that facilitates the user supplying his or her MIC and voting.

In these remote voting scenarios, a MIC can be a ubiquitous credential such as an electronic driver's license or an electronic identification credential with targeted information such as a virtual identification "card" or a voting MIC, that includes tailored information that relevant to its use in identifying the voter.

Returning to the remote voting scenario, the user may assert an identity represented by MIC and encrypt it (MIC) with the user's private key. Emily, for example upon attempting to vote using her smart phone, can encrypt her mDL using PKI public key infrastructure encryption. In this example, she encrypts the mDL using her private key and includes her public key (corresponding to her private) in a digital certificate that is communicated as part of her now "Emily encrypted" mDL. In some embodiments, such encryption occurs prior to attempted use of the encrypted MIC, this is to say the user encrypted MIC. She may, via her smart phone, encrypt the mDL (which was previously encrypted using Emily's private key and originally by the DMV using its private key) with the portal's public key. For example, once the mDL is encrypted on Emily's phone using her private key she (via her smartphone) encrypts the mDL using the portal's public key. Although the user can direct or control the computing device to encrypt the MIC such as by directing the device to "encrypt now," in embodiments an application loaded on or otherwise available to the user's mobile device can do this. For example, Emily uses an app on her phone that electronically performs this on her behalf. In scenarios such as this, the user can still trigger or control the action. It should be apparent that access to or control over such an application and its behaviors may implement security features such as use of a personal identification number (PIN) or biometric identification, e.g., fingerprint recognition included in or otherwise associated with the computing device, such as to gain access to the device in the case of a smart phone.

With the mDL encrypted with the portal public key, a user, such as Emily can use her smart phone to electronically communicate the mDL to the entity (county election board) via the portal. For example, once on a web site functioning as a portal, Emily selects a button that popup an "open" dialogue box that allows her to specify a file containing her mDL that is or will be encrypted using a private key available on her smart phone (e.g., "Emily's private key) and submit it to the portal. In some embodiments, this the encrypted MIC may be prepopulated such as by linking or pointing to memory that stores the MIC.

The relying party (e.g., county election board) can use its private key to decrypt the mDL and use the voter's public key (Emily's key) to decrypt the mDL. In the preceding example, the county system is informed of Emily's public key as it is in the digital certificate included with the mDL she is using to verify her identity. Though dual portal (receiving party) and user encryption or decryption is discussed, implementation of user's encryption or decryption is implemented. In scenarios such as this, the mDL issued by the DMV underlies the various encryptions that function effectively as an electronic chain of custody to electronically prove the provenance of the mDL which the relying party (county) is relying on to verify Emily's identity.

In some embodiments, the relying party (county) verifies the validity of the MIC with the issuing authority. For example, the county election board electronically checks the DMV system to confirm that the mDL (e.g., the digital certificate for the mDL issued by the DMV) received from Emily's device is genuine.

Process Embodiments

In additional embodiments, to verify the identity of the voter or user, the RPS 130 requests voter ID information of the voter, which may include some or all of the content of the MIC. For example, the RPS via the user's mobile device communicates a request for MIC information that is output on a display on the mobile device. A variety of approaches can be used for accomplishing this, including use of an electronic communication (email, instant message) or a popup that requests user input that triggers the mobile device to provide MIC information. The voter has the option of consenting to release selectively some or all of the requested information. The voter can give consent to release additional information pertaining to eligibility as requested by the RPS via the mobile device. The eligibility information depends on what information the organization or jurisdiction established the RPS request. It may include age and residency or domicile information, and may further include citizenship information (e.g., passport or birth certificate to establish citizenship), voter registration, etc. For example, the RPS as part of establishing residence requests and accepts an electronic copy of a recent utility bill indicating a place of residence. Other sources of information (e.g., credit card) can be used for similar purposes. If the voter ID information provided appears suspicious, additional information may be solicited.

Figure 5:
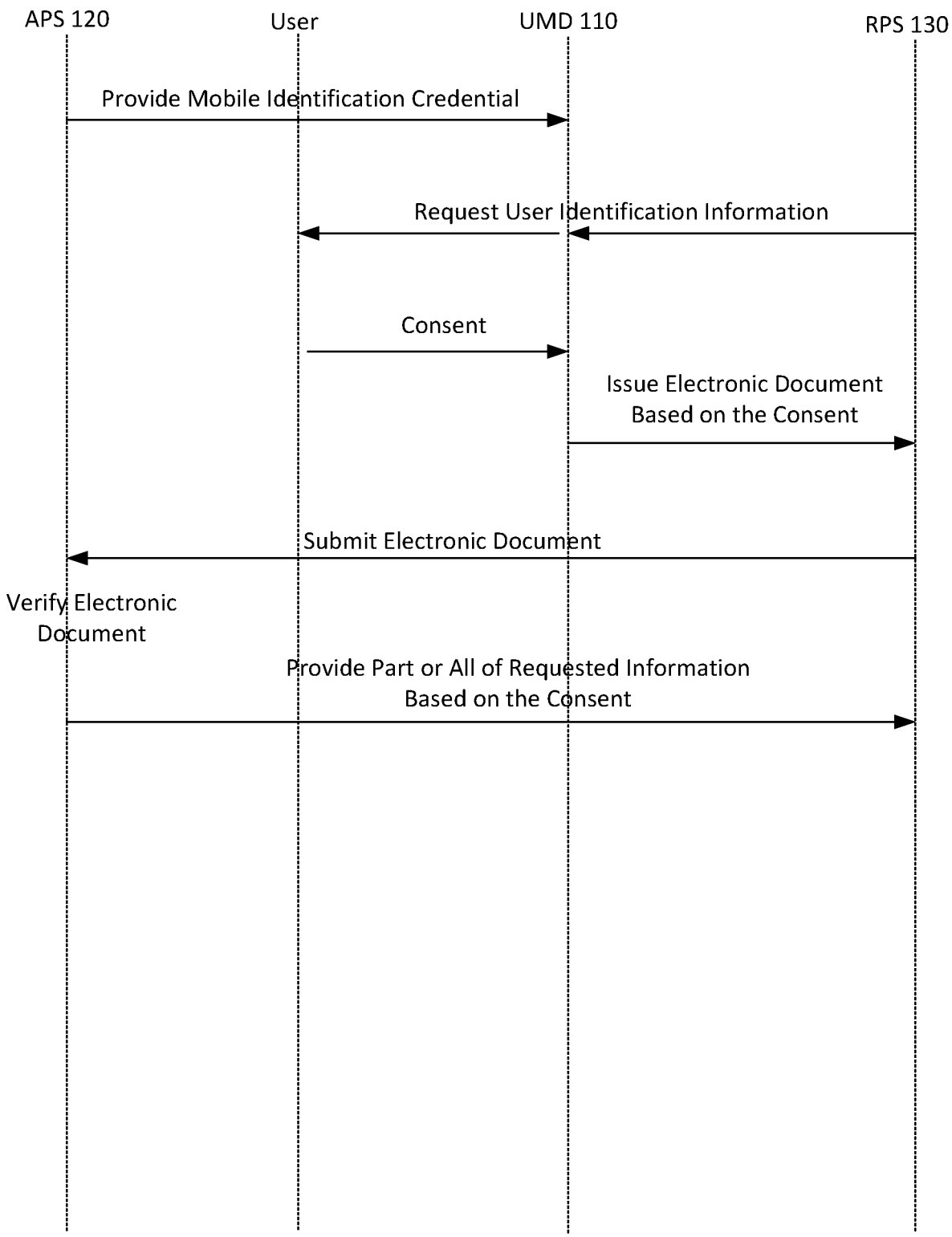
FIG. 5 illustrates verifying information of a voter requesting a voting ballot using mobile identification credential (MIC) according to embodiments.

In an embodiment illustrated in FIG. 5, the voter uses the UMD 110 to electronically request a voting ballot from the RPS 130. As part of the process, the RPS requests the UMD provide ID and/or eligibility information. In response, the UMD issues the RPS an electronic file. In some embodiments, the file may include a digital certificate with information indicating what MIC information is to be released to the RPS, based on the voter's consent. For example, the RPS may request optional information, such as political affiliation, that the voter does not want to provide. In this case, the information provided by the UMD indicates that information other than political affiliation is to be provided and by implication that release of political affiliation information is not permitted. The UMD can encrypt the file including the consent information using a private key for the user or UMD and include a digital certificate with the user's or UMD's public key so the RPS can electronically verify the contained information including the consent information, originated with the user.

The RPS 130 may submit the electronic file to the APS 120. Those of skill in the art will appreciate that the RPS can encrypt and electronically sign the file using the RPS's private encryption key. Upon verification of the electronic document, such as by using the RPS's public key, the APS may provide some or all of the requested MIC information as specified by the consent information from the UMD that is in the file. For instance, if establishing voter identity is the only concern, the voter may choose to release only information sufficient to establish identity and omit either by directing omission or through implication information such as age, ethnicity, gender, national origin, etc. When the identity or eligibility of the user is verified based on preestablished criteria the RPS 130 can issue a ballot to the UMD 110 for completion by the voter. In scenarios involving physical ballots, the RPS can, for example, print a mailing label so the voter can manually complete the ballot and return it by dropping it off or mailing it back to the RPS. The RPS can provide an electronic ballot for download to the UMD or in a graphical user interface supported by a web or application enabled portal. In instances in which the APS cannot verify the MIC, it can electronically notify the UMD and request the UMD resubmit the MIC request.

Figure 6:
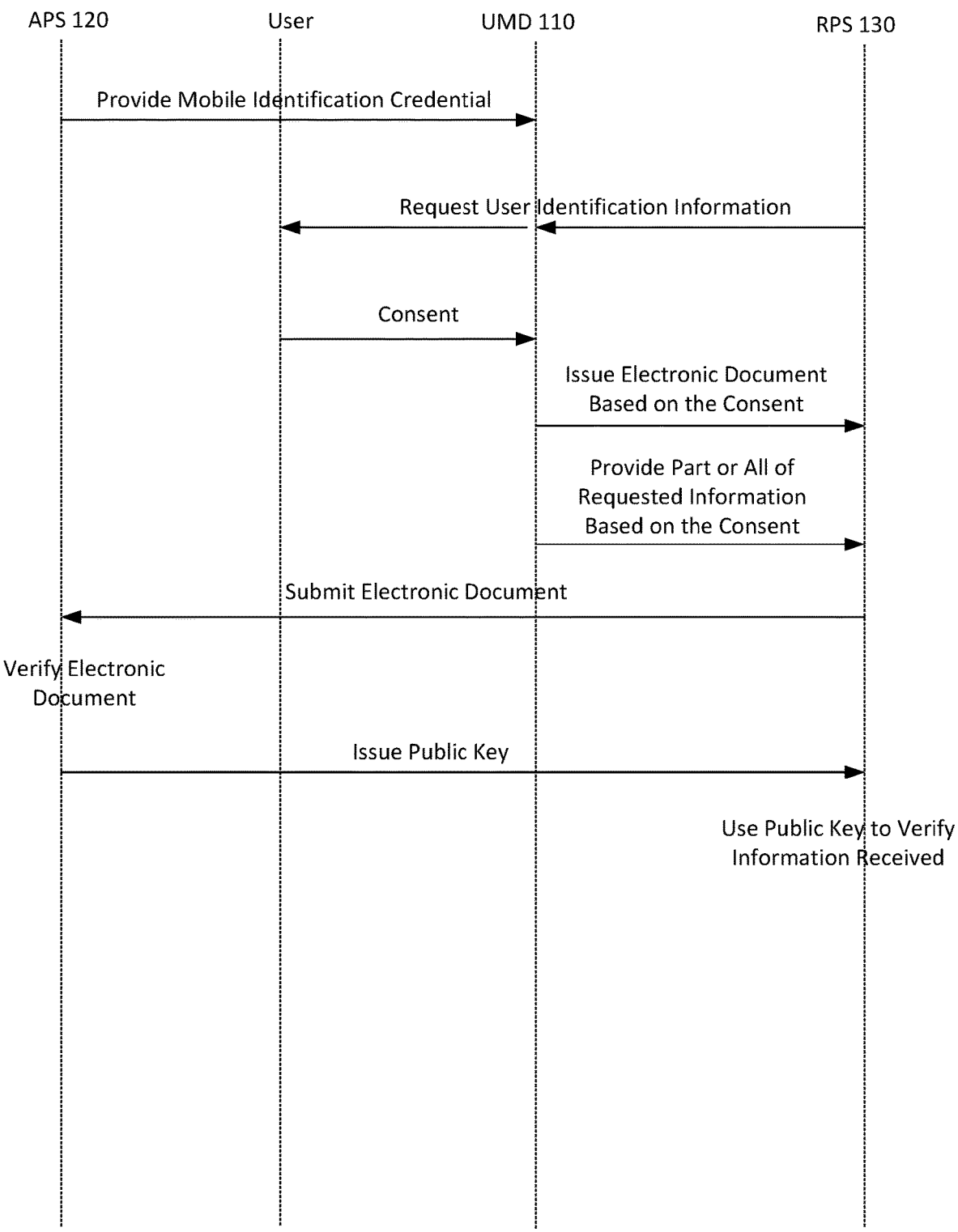
FIG. 6 illustrates verifying information of a voter requesting a ballot using MIC according to other embodiments.

In another embodiment illustrated in FIG. 6, the RPS electronically requests MIC information from the UMD to be used in ascertaining the identity or voter eligibility of UMD's user. In response, the UMD 110 may issue the RPS an electronic document or a digital file with at least some MIC information, based on user input. In examples, the digital file may be encrypted with one or more private encryption keys. Examples of the foregoing include the private encryption keys for the APS and the UMD, e.g., with the UMD encrypting the MIC from the APS. The MIC information provided by the UMD can be based on user selection for the specific situation (e.g., this particular transaction) or based on previously received preferences, such as privacy preferences, that are stored in memory on the UMD. In instances in which the MIC is encrypted with the users' or UMD's private key, the RPS decrypts it using the corresponding user or UMD public key. The RPS can verify the MIC information by validating the digital certificate for the underlying MIC (e.g., the file that is now decrypted) with the APS. If the digital certificates match, this can be used by the RPS as an indication that the MIC information in the digital file corresponds or matches to the information in APS memory.

In addition, the UMD 110 can provide the RPS 130 part or all of the requested MIC information based on the consent input from the user. The RPS 130 may submit the electronic document to the APS 120. Upon verification of the electronic document, the APS 120 may issue a public key to the RPS 130. The RPS 130 may be programmed to use the public key to verify the information received from the UMD 110. In specific embodiments, the information was encrypted or digitally signed using a private key and the public key is used to decrypt the encrypted information or read the digitally signed information. When the identity and eligibility of the voter are verified, the RPS 130 can issue an electronic ballot to the UMD 110 or take steps to effectuate voting if a physical ballot is selected, e.g., print off mailing information using an attached printer.

In some instances, the RPS 130 does not have to submit anything to the APS 120 to obtain the public key. In general, the only time the RPS 130 will have to go to the APS 120 is to refresh the public keys. In some cases, there may be a public key distributor (PKD). The distributor would be an agent acting on behalf of several trusted entities. This agent would hold the most up-to-date public keys and distribute to trusted relying parties. In instances that do not implement PKI approaches, information other than encryption keys can used to verify parties to a communication. In these examples, authentication keys are a mechanism to promote trust and prevent a third party from interfering with information between the parties, e.g., "man-in-the-middle" attacks. Though authentication keys can be passed as part of establishing a communication link, in other situations the keys may be pre-negotiated by the parties exchanging the keys, such as over a secure channel, which may be implemented in situations where the communicating parties (e.g., APS and RPS have preexisting relationship). An example of the foregoing is a DMV database system for a state exchanging authentication keys with that state's government run election system. In examples, the RPS 130 may submit a request for the APS key in a digital file that is electronically passed to the APS 120 in exchange for the APS authentication key that is not made public.

The use of a public key to authenticate a digital signature or the like is merely an example. In other embodiments, the APS 120 may issue another electronic document or digital file or the like (e.g., referred to as "authentication key") which the RPS 130 can use to verify that the information received from the UMD 110 can be trusted to establish the identity of the user (i.e., to verify the authenticity of the information received). In one example, the authentication key may be a public key that refreshes after a very short time, thereby prompting the RPS 130 to reach out to the APS 120 when it is time to verify the information and use the public key with a short lifespan before it expires.

When the received electronic document is not verified by the APS, the APS 120 may send the RPS 130 a notification to resubmit the request for the voter's identification or eligibility MIC information. When the identity or eligibility of the voter is verified to a predetermined standard established by of the relying party, the RPS 130 can provide the requested voting ballot to the voter. This can involve physical transfer, or digital communication such as digital transfer to the UMD 110 or permitting the UMD access to the RPS supported portal so the user can input his/her votes in the portal.

Figure 7:
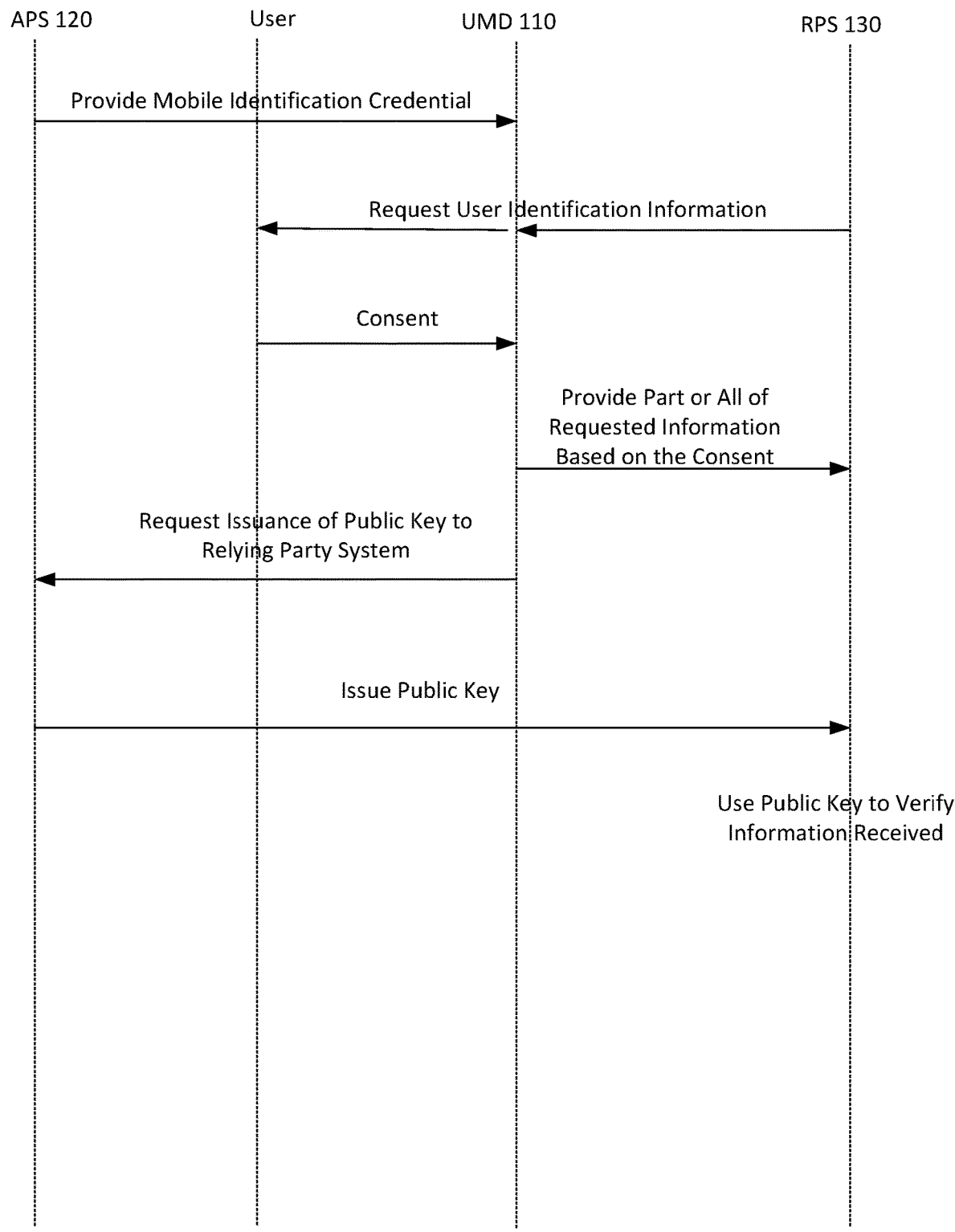
FIG. 7 illustrates verifying information of a voter requesting a ballot using MIC according to other embodiments.

In an embodiment illustrated in FIG. 7, the UMD 110, having received the MIC from the APS 120, receives a request for voter ID or eligibility information from the RPS 130 and provides part or all of the requested MIC information to the RPS 130 based on the voter's consent. In embodiments, at least some of the content (e.g., the consent information) of the file in which the request is made may be digitally signed by the UMD or encrypted with the voter's or user's private key so the APS can confirm the user (UMD) is the source of the consent. The UMD 110 can electronically request that the APS 120 issue the RPS 130 a public key. The APS 120 may issue the public key to the RPS 130, which can be used by the RPS to verify the information received from the UMD 110 that is encrypted with the APS's private key and/or a private key for the user and (optionally) a public key of the RPS, such as if it is submitted via a web enabled portal. Use of a public key is merely an example. In some instances, an authentication key may be used so the RPS 130 can verify that MIC information from the UMD 110 matches that of the APS. When the identity or eligibility of the voter is verified to a predetermined standard of the relying party, the RPS 130 can provide the requested voting ballot to the voter which can involve physical transfer, shipping, or digital transfer to the UMD 110.

Figure 8:
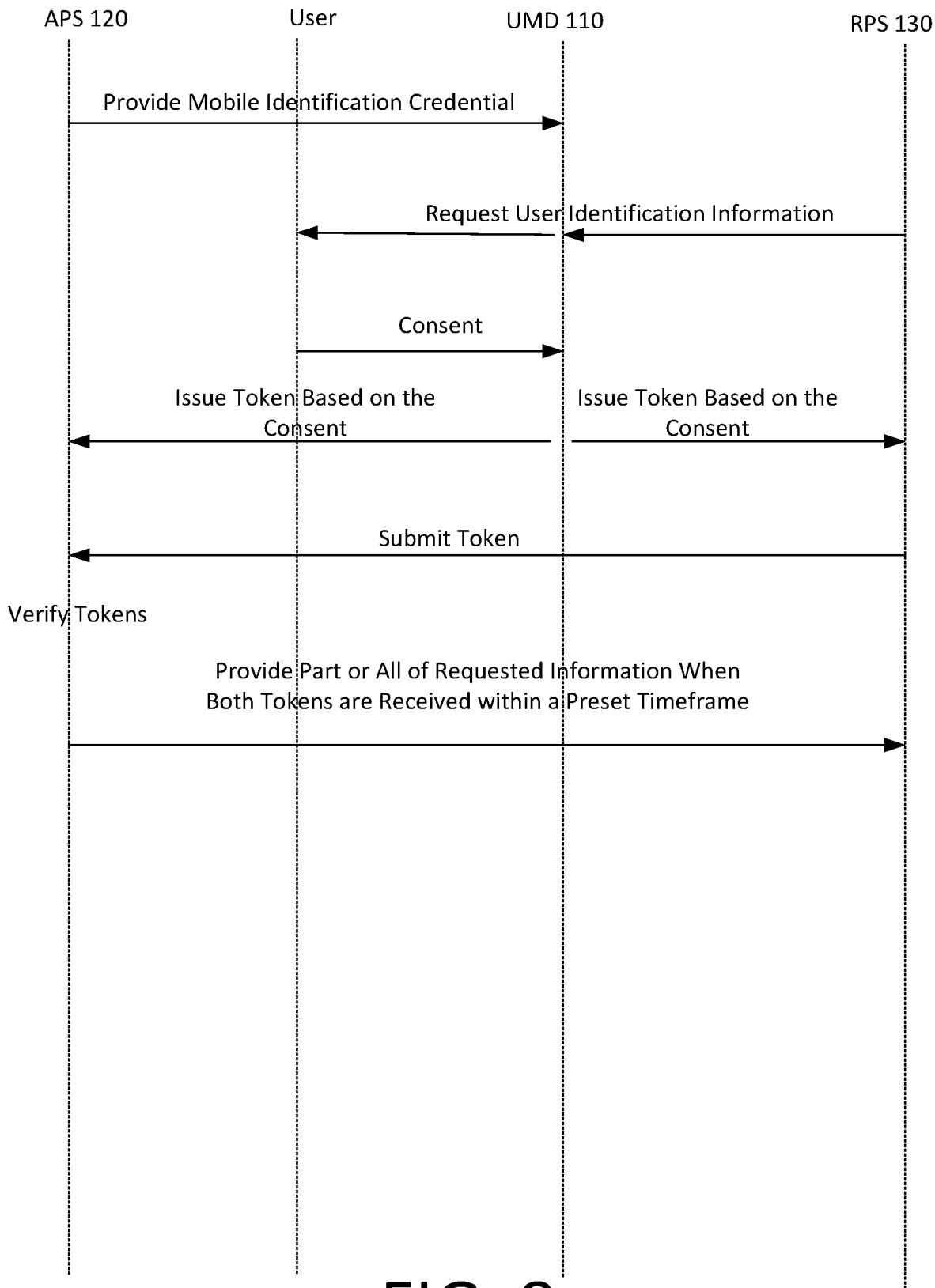
FIG. 8 illustrates verifying information of a voter requesting a ballot using MIC according to other embodiments.

In another embodiment illustrated in FIG. 8, the UMD 110, having received the MIC from the APS 120, receives a request for voter ID or eligibility information from the RPS 130. In response, the UMD 110 may issue, based on the voter's consent, a token to the RPS 130 and another token to the APS 120. The RPS 130 may submit the received token to the APS 120. When both tokens are received within a preset timeframe (e.g., within 30 minutes, within 10 minutes, within 3 minutes, within 1 minute, within 30 seconds, etc.) and are matched or otherwise verified by the APS, the APS 120 may provide part or all of the requested information associated with the MIC to the RPS 130. When the tokens are not received by the APS within the preset timeframe or are not verified by the APS, the APS 120 may send a notification to the RPS 130 to resubmit the request for ID or eligibility information of the voter. When the identity or eligibility of the voter is verified to a predetermined standard applied by the relying party, the RPS can provide the requested voting ballot to the voter which can involve physical transfer, shipping, or digital transfer to the UMD 110.

In an embodiment, when the voter requests the voting ballot from a remote location, the system may implement a liveness check. For example, as part of remote voting via a portal, the RPS may communicate a liveness check to be completed by the user before he/she is permitted to submit his/her selections. The liveness check is used to confirm that a human is, in this instance, seeking vote and not a computer such as a bot.

Figure 9:
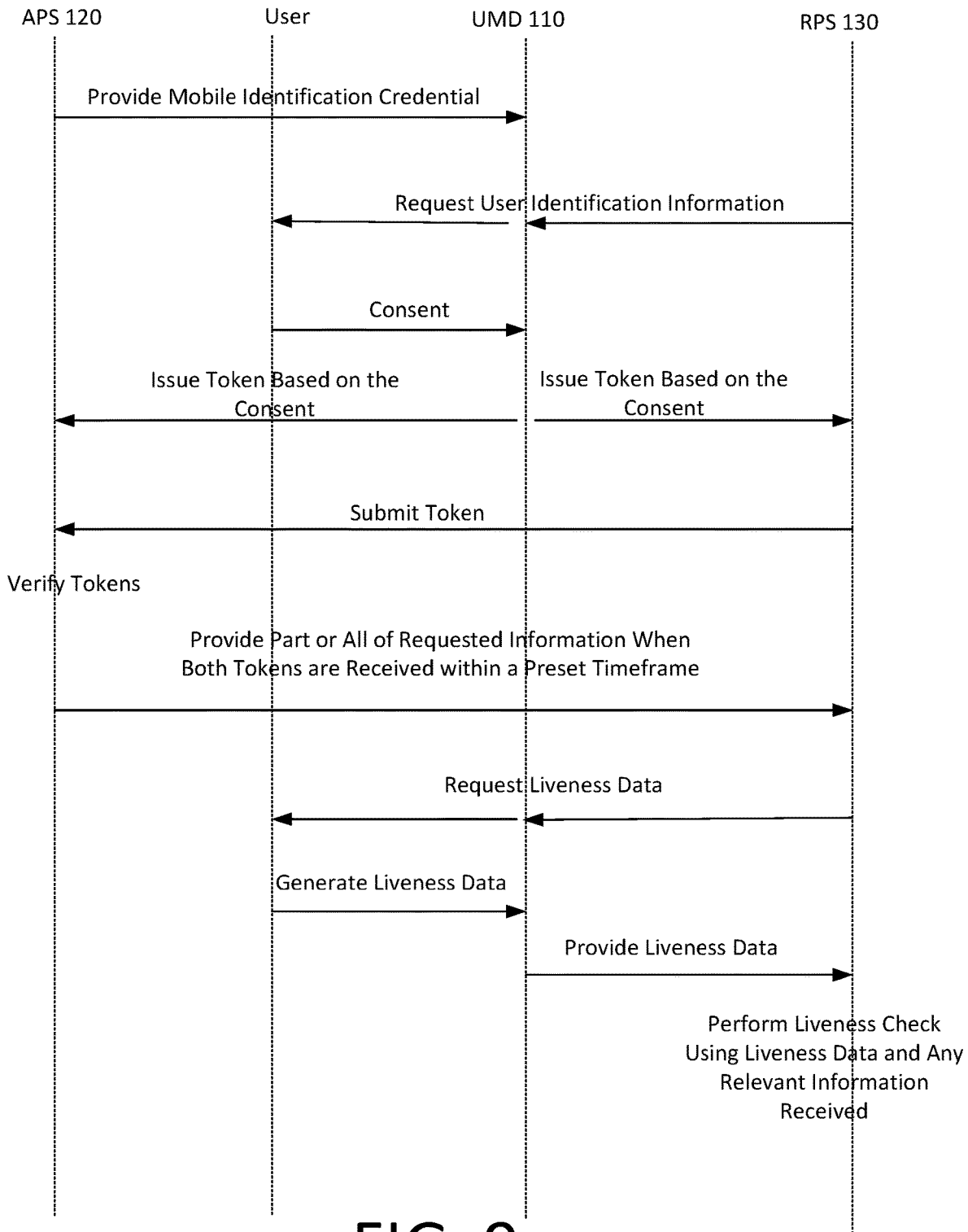
FIG. 9 illustrates performing a liveness check of a voter requesting a ballot according to embodiments.

In another embodiment illustrated in FIG. 9, which builds upon FIG. 8, the RPS 130 requests liveness data from the UMD 110. The voter may generate the liveness data using the UMD 110, which provides the liveness data to the RPS 130. Examples of the liveness data include a live facial image, a live video, a live iris or retina scan, and a live fingerprint scan of the user acquired by the UMD 110. While a liveness check can include biometrics information, in some instances it may be merely an indicator of human involvement. The RPS 130 may perform the liveness check using the liveness data and any relevant information received (e.g., comparing the live image or video with a photograph of the voter contained in the MIC). While the embodiment illustrated in FIG. 9 shows that the liveness check is performed after the identity verification process, the order can be reversed in other embodiments.

Figure 10:
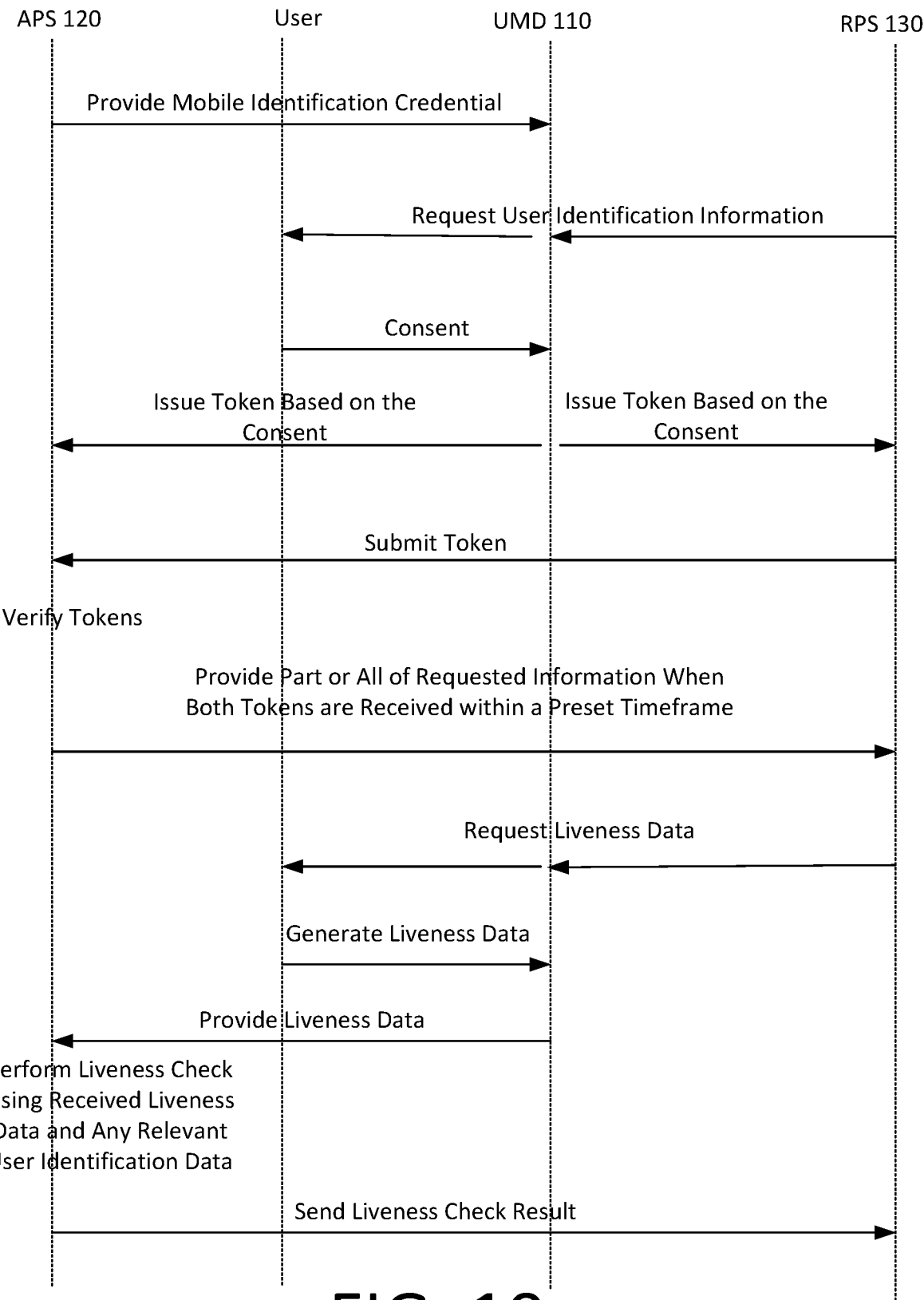
FIG. 10 illustrates performing a liveness check of a voter requesting a ballot according to other embodiments.

In another embodiment illustrated in FIG. 10, which builds upon FIG. 8, the RPS 130 requests liveness data from the UMD 110. The voter may generate the liveness data using the UMD 110, but instead of providing the liveness data to the RPS 130 as in FIG. 9, the UMD 110 provides the liveness data to the APS 120. The APS 120 may perform the liveness check using the received liveness data and any relevant user information such as stored voter identification data (e.g., contained in the MIC), and send the liveness check result to the RPS 130.

The embodiments in FIGS. 5-10 show devices that can connect to the APS 120, e.g., via the Internet, during the voting transaction. The RPS 130 can obtain, directly from the APS 120, the MIC information (FIGS. 5 and 8) or a public key or some other electronic document or digital file to verify the MIC information that the RPS 130 has received (FIGS. 6 and 7). Certificates or the like from a Trust List can be used to validate the Base URLs of the APS 120.

In offline embodiments, local transmission links between the UMD 110 and the RPS 130 can be made through a direct connection such as a tap wireless connection or displaying or optically reading a QR code output on a display included in one of the devices. A communication connection between one or more devices can be secured by standardized key exchange and encryption of the data. The RPS 130 can verify that the data received from the UMD 110 is valid and unchanged using certificates from a Trust List, or the public key of the APS which is available, or the like. The process ensures that the MIC information from the UMD 110 was not cloned from another UMD.

Figure 11:
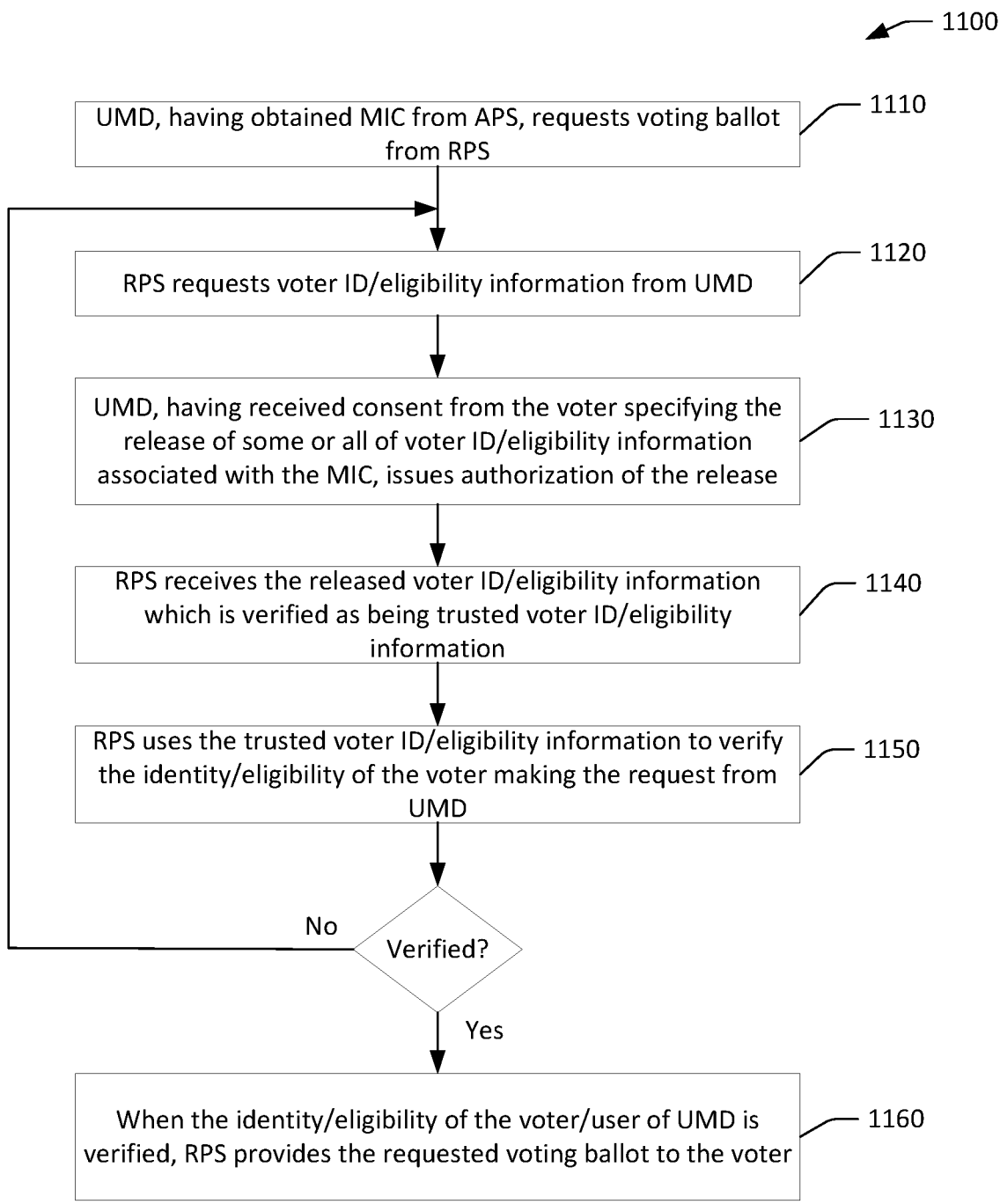
FIG. 11 is a flow diagram illustrating processes for a voter to request a ballot.

FIG. 11 is a flow diagram 1100 illustrating example processes for obtaining a voting ballot by a voter. As illustrated, the UMD (e.g., voter's device), having obtained the MIC from the APS (e.g., DMV system), requests a voting ballot from the RPS (1110) (e.g., election official at voting precinct or an election office) using a secure connection, for instance, via a secure network, a https secured portal, a virtual private network or the like as understood by one of ordinary skill in the art. The UMD may be a mobile device presented at the voting precinct on election day or some other device (stationary or mobile) from a remote location (e.g., electronic voting, early voting, or absentee voting).

One way to establish a secure connection is by using session keys. At initial engagement, the first device (Device 1) electronically passes its session public key to a second device (Device 2). Device 2 will use its private key and Device 1's public key to generate Device 2's public key. Device 2's public key is shared with Device 1. These ephemeral key pairs are used to encrypt and decrypt messages sent between Device 1 and Device 2. A session begins when the two devices acknowledge respectively acknowledge other and open a virtual connection and ends when the two devices send a "finished" messages, terminating the connection.

As illustrated, the RPS requests voter ID or eligibility information from the UMD in response to the request for a voting ballot (1120). The voter may be notified of the request via a display or some other user interface on the UMD, and may give consent via a user interface of the UMD to release some or all of the requested voter ID or eligibility information associated with the MIC. Though some user input is contemplated, in some examples a privacy profile or settings may be used based on pre-entered user preferences. The UMD can authorize release of the information, based on the voter's consent, to the RPS or the APS in different embodiments (1130). In some embodiments, the authorization may take the form of a token, an electronic document, a digital file, or the like issued by the UMD to the RPS that submits at least part of it to the APS to verify the token, electronic document, digital file, or the like via the secure network. In other embodiments, the authorization may be a substantially direct request from the RPS to the APS or a token sent from the UMD to the APS.

The RPS in examples receives the released voter ID or eligibility information (1140) (e.g., information from the MIC) which is verified as being MIC information from the APS, such as due to the use of PKI encryption, use of a secure communication channel and/or the use of authorization keys and the like to promote trust by making interference, etc. impractical based on available computing resources. In different embodiments, the APS may receive the authorization from the UMD (e.g., substantially direct request in FIG. 7 or token in FIG. 8) or may examine the authorization from the RPS (e.g., electronic documents in FIGS. 5 and 6 or token in FIG. 8) for verification or nonverification. When the authorization is verified, it establishes that the voter ID or eligibility information received by the RPS is valid and can be trusted. In some embodiments, the RPS may receive and use a public key or some other electronic document or digital file to verify that the voter ID information received from the UMD is trustworthy.

Next, the RPS can use the trusted voter ID or eligibility information, which may be received from the UMD or the APS, to verify the identity or eligibility of the voter who requests the voting ballot from the UMD (1150). In some cases, the verification may involve matching the voter's name. In other cases, more may be required to a pre-established standard as applied by the RPS. For instance, the verification may involve matching other biographic and/or biometric information and/or additional information. What approaches are implemented depend on the nature of the situation. For in-person voting, biographic or biometric information can be obtained from the person. For instance, the RPS may include or be associated with an electro mechanical device acquisition device to capture biometric information from a user (e.g., fingerprint matching or recognition by a fingerprint reader, iris matching or recognition by iris scanner, facial matching or recognition by a facial imaging device, voice matching or recognition by a voice recording device etc.). For online voting, such information can be obtained from a trusted source and/or a liveness check can be implemented. If the identity or eligibility of the user is not verified, the RPS may request resubmission of the voter ID or eligibility information from the UMD. In-person voting can make use of a physical ballot or an electronic ballot that is transmitted to the UMD so the user can cast his/her ballot. For electronic voting, early voting, or absentee voting from a remote location, an electronic ballot may be transmitted to the UMD or otherwise made available, such as through a web-enabled portal, and the voter may use the UMD to cast votes and transmit them to the RPS.

When the identity or eligibility of the voter from the UMD is verified to a predetermined standard as determined by the relying party, the RPS can provide the requested ballot (1160). For in-person voting, a user may receive a physical ballot. In other in-person voting embodiments, the RPS may transmit an electronic ballot to the UMD or a user may be given access to a portal, such as supported by the RPS and a voting application on the UMD or a website accessible via the UMD. The user can cast his/her vote via the UMD and transmit them to the RPS. For electronic voting, early voting, or absentee voting from a remote location, the RPS can transmit an electronic ballot to the UMD or the UMD may be given mechanism to access or submit votes such as by sending an email with a secure link (e.g., a one-time link) sending a text or messaging the UMD user via the application loaded on the UMD. The voter may use the UMD to cast his/her votes and transmit them to the RPS or may enter them via, for example, a website supported directly or indirectly by the RPS.

Figure 12:
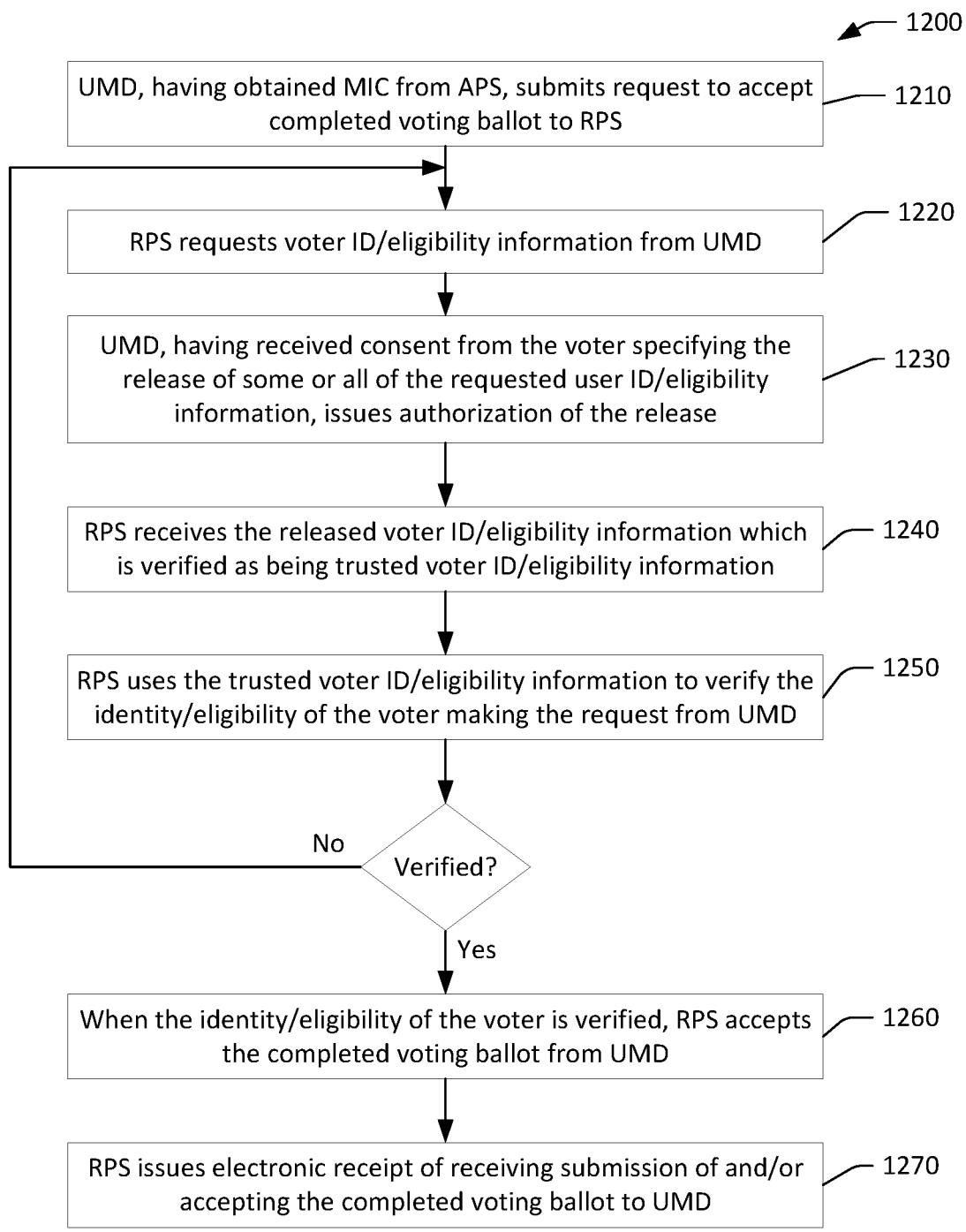
FIG. 12 is a flow diagram illustrating processes for voters to submit filled in ballots.

FIG. 12 is a flow diagram 1200 illustrating an embodiment of a process for the voter to submit a ballot to the election office. It is to be appreciated in embodiments, the ballot may be filled out on the UMD via a portal supported by the RPS, so the information may be made available to the RPS as the user makes his or her selections or when the user registers his/her votes by selecting "submit" to complete the voting transaction with the relying party. The voter can use the UMD to submit a request to accept the electronic voting ballot to the RPS (election office system) (1210). The voting ballot can be filled out at various locations such the voting precinct or at a remote location using the option of electronic voting, early voting, or absentee voting. Although remote voting (not at an established location as contemplated) is permitted in some instances, geofencing can be used to ensure the voter is physically within a predefined area (e.g., physically within the jurisdiction) when placing or submitting his/her vote. For example, as part of the voting process, the RPS may request the UMD's location (e.g., global positioning system) to ensure the person is within the jurisdiction. In such instances, time stamps, one-time short duration codes and so forth as understood by one of skill in the art can be used to reduce or minimize the likelihood of interference by unauthorized third parties or unauthorized voting from outside the physical jurisdiction by persons attempting to interfere with the integrity of the election.

In embodiments, the RPS requests voter ID or eligibility information from the UMD in response to the request to submit the user's voting selection (1220). The voter can be notified of the request via a display or some other output component of the UMD and may give consent to release some or all of the requested voter ID or eligibility information, e.g., clicks a virtual submit button via a user interface of the UMD. The UMD, having received consent from the voter, authorizes its release (1230). In some embodiments, the authorization may be a direct request from the RPS, or a token sent from the UMD to the APS. The RPS receives the released voter ID or eligibility information which is verified as being trusted voter ID or eligibility information (1240). In different embodiments, the APS may receive the authorization from the UMD (e.g., direct request) or may examine the authorization from the RPS (e.g., electronic documents or a token) for verification or nonverification. When the authorization is verified, it establishes that the voter ID or eligibility information received by the RPS is valid. In some embodiments, the RPS may receive and use a public key or some other electronic document or digital file to verify that the voter ID or eligibility information received from the UMD is trustworthy.

The RPS can use the trusted voter ID or eligibility information, which may be received from the UMD or the APS, to verify the identity eligibility of the voter making the request for the voting ballot from the UMD (1250). In some cases, the verification may involve matching the voter's name and age. In other cases, the verification may involve matching other biographic and/or biometric information and/or additional information. If the identity or eligibility of the voter is not verified, the RPS may request resubmission of the information. When the identity or eligibility of the voter from the UMD is verified to a predetermined standard established by the relying party (1260), the RPS accepts the completed voting ballot from the UMD. The RPS may issue an electronic acceptance receipt or some other acknowledgement of accepting the completed voting ballot to the UMD (1270). Alternatively or additionally, the RPS may issue an electronic submission receipt or the like of receiving the request to submit the completed voting ballot to the UMD. The receipts may be encrypted.

Figure 13:
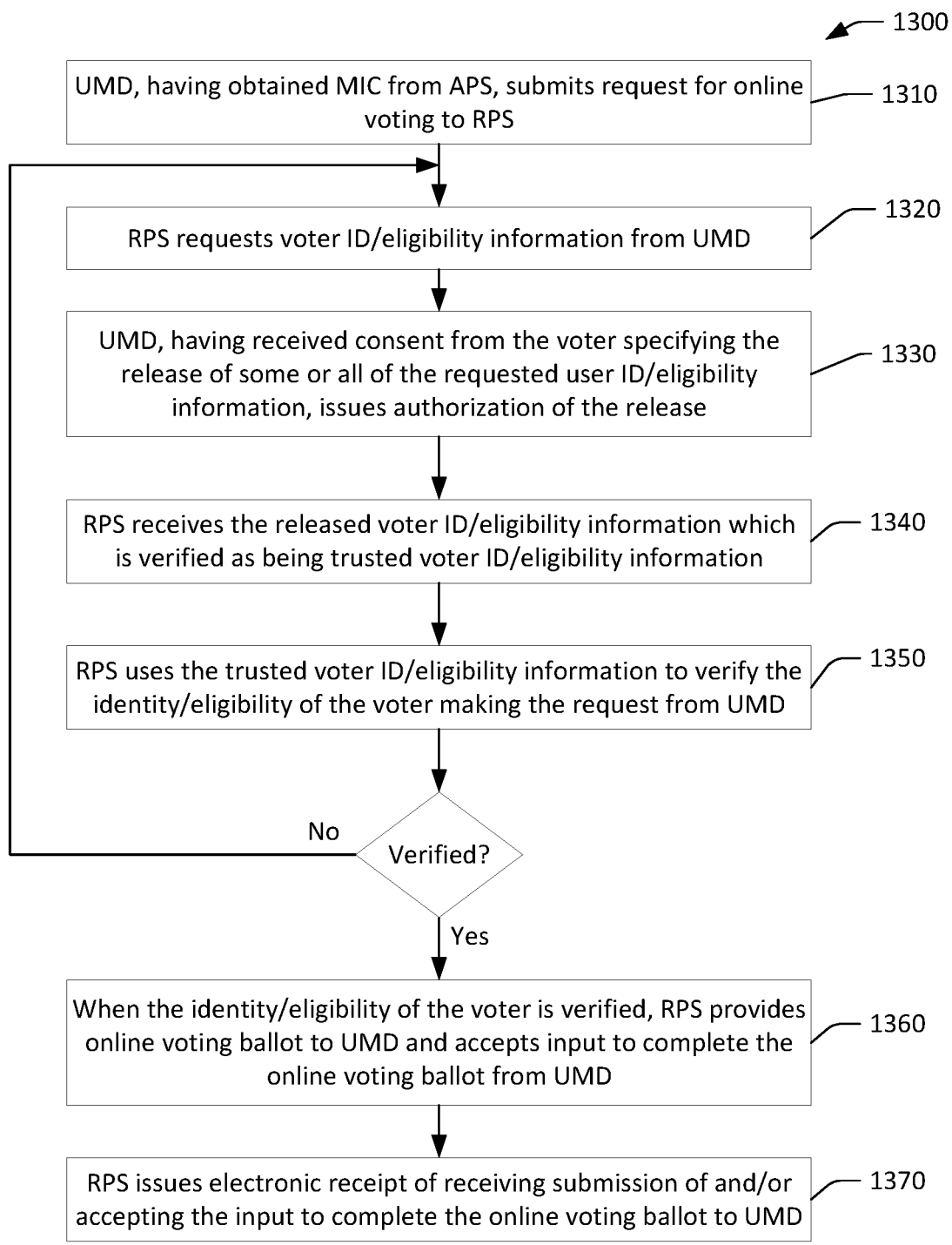
FIG. 13 is a flow diagram illustrating processes for voters to request online ballots.

In embodiments, obtaining and completing a ballot are combined in an online process as illustrated in FIG. 13. In such a process, the voter can use a UMD to submit a request for online voting to the RPS (election office system). This covers different scenarios of online voting at the voting precinct or, if available, at a remote location using the option of electronic voting on election day, early voting, or absentee voting. The RPS requests voter ID or eligibility information from the UMD in response to the request for online voting (1320). The voter may be notified of the request via a user interface on the UMD and give consent to release some or all of the requested voter ID or eligibility information via a user interface of the UMD. The UMD, having received consent from the voter specifying the release of some or all of the requested voter ID or eligibility information, may issue authorization of the release (1330). The RPS can receive the released voter ID or eligibility information which is verified as being trusted voter ID or eligibility information (1340). When the authorization is verified, it establishes that the voter ID or eligibility information received by the RPS is valid and can be trusted.

The RPS can use the voter ID or eligibility information to verify the identity or eligibility of the voter making the request for the online voting from the UMD (1350). If the identity or eligibility of the voter is not verified, the RPS may request resubmission of the voter ID or eligibility information from the UMD. When the identity or eligibility of the voter from the UMD is verified to a predetermined standard applied by the relying party, the RPS may provide an online voting ballot to UMD and accepts input to complete the online voting ballot from UMD (1360). The RPS may issue an electronic acceptance receipt or some other acknowledgement of accepting the input to complete the online voting ballot to the UMD (1370). Alternatively or additionally, the RPS may issue an electronic submission receipt or the like of receiving the request to submit input to complete the online voting ballot to the UMD. The receipts may be encrypted. The UMD and the RPS are in communication via a secure connection while the voter completes the online voting ballot via a user interface on the UMD.

The inventive concepts taught by way of the examples discussed above are amenable to modification, rearrangement, and embodiment in several ways. For instance, while the examples discussed are primarily directed to government elections, the same approach can be adopted for use in private elections for company officials or the like. It can also be used for surveys, contests, judging competitions, or other situations where votes or entries from a group of participants are collected and the result determined based on those votes or entries.

Various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associate with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware and/or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not be taken as limiting or restricting the systems, techniques, approaches, methods, devices to those appearing in any particular section. Rather, the teachings and disclosures herein can be combined, rearranged, with other portions of this disclosure and the knowledge of one of ordinary skill in the art. It is the intention of this disclosure to encompass and include such variation.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A method for a voter having a voter device to request a voting ballot for an election from an election office having an election office system, the method comprising:
   receiving, by the election office system from the voter device, a request for the voting ballot for the election, part or all of voter identification (ID) information associated with a first mobile identification credential (MIC) which includes the voter ID information, wherein a first authorizing party system (a first APS) is a separate system from the election office system and has electronically provisioned the first MIC including the voter ID information comprising at least one of biographic information or biometric information or unique information of the voter onto the voter device, and consented data indication which indicates the part or all of voter ID information that is authorized by the voter device for release by the first APS to the election office system, the first APS having verified the voter ID information before the election office system receives from the voter device the request for the voting ballot for the election, the part or all of voter ID information which has been verified by the first APS to be provided to the election office system as verified part or all of voter ID information;
   using, by the election office system, the verified part or all of voter ID information included in the first MIC, to verify or not verify an identity of the voter;
   granting, by the election office system, the request to provide the voting ballot to the voter if the identity of the voter is verified; and
   denying, by the election office system, the request to provide the voting ballot to the voter if the identity of the voter is not verified.

2. The method of claim 1,
   wherein the part or all of voter ID information is provided to the election office system as the verified part or all of voter ID information in offline mode by using an offline stored key of the first APS to verify that the part or all of voter ID information is trustworthy.

3. The method of claim 1, further comprising:
   receiving, by the election office system from the voter device, a token as a received token specifying the part or all of voter ID information which the voter has consented to release to the election office system;
   sending, by the election office system to the first APS, the received token, which is to be verified by the first APS with another token sent from the voter device to the first APS;
   when the tokens are received by the first APS within a preset timeframe and are verified by the first APS, receiving, by the election office system from the first APS, the part or all of voter ID information as the verified part or all of voter ID information; and
   when the tokens are not received by the first APS within the preset timeframe or are not verified by the first APS, receiving, by the election office system from the first APS, a notification to resubmit the request for ID information of the voter.

4. The method of claim 1, further comprising:
   receiving, by the election office system from the voter device, an electronic document as a received electronic document specifying the part or all of voter ID information which the voter has consented to release to the election office system;
   sending, by the election office system to the first APS, the received electronic document;
   when the received electronic document is verified by the first APS, receiving, by the election office system from the first APS, the part or all of voter ID information as the verified part or all of voter ID information; and
   when the received electronic document is not verified by the first APS, receiving, by the election office system from the first APS, a notification to resubmit the request for ID information of the voter.

5. The method of claim 1, further comprising:
   receiving, by the election office system from voter device, an electronic document as a received electronic document and the part or all of voter ID information which the voter has consented to release to the election office system;
   sending, by the election office system to the first APS, the received electronic document;
   when the received electronic document is verified by the first APS, receiving, by the election office system from the first APS, an authentication key to verify the part or all of voter ID information received from the voter device; and
   when the received electronic document is not verified by the first APS, receiving, by the election office system from the first APS, a notification to resubmit the request for ID information of the voter.

6. The method of claim 1, further comprising:
   receiving, by the election office system from the voter device, the part or all of voter ID information which the voter has consented to release to the election office system; and
   receiving, by the election office system from the first APS, an authentication key to verify the part or all of voter ID information received from the voter device, based on a request sent from the voter device to the first APS.

7. The method of claim 1, wherein the voter ID information further comprises voter eligibility information of the voter, the method further comprising:

sending, by the election office system to the voter device, a request for voter eligibility information of the voter;

receiving, by the election office system, part or all of the voter eligibility information included in the first MIC which the voter device received from the first APS or a second MIC which the voter device received from a second APS, wherein the voter has consented to release the part or all of voter eligibility information to the election office system, and wherein the part or all of voter eligibility information has been verified by the second APS as verified part or all of voter eligibility information before the election office system sends to the voter device the request for the voter eligibility information;

using, by the election office system, the verified part or all of voter eligibility information to verify or not verify voter eligibility of the voter;

granting the request, by the election office system, to provide the voting ballot to the voter, when the identity and the voter eligibility of the voter are verified; and denying the request, by the election office system, to provide the voting ballot to the voter, when the identity or the voter eligibility of the voter is not verified.

8. The method of claim 1, wherein the voting ballot requested is an electronic voting ballot, and wherein the request for the voting ballot includes a request to accept the electronic voting ballot which is completed by the voter from the voter device as a completed electronic voter ballot, the method further comprising:

verifying the identity of the voter before granting the request, by the election office system, to accept the completed electronic voting ballot from the voter device.

9. The method of claim 1, further comprising:

sending, by the election office system to the voter device, a request for a liveness check;

receiving, (i) by the election office system, from the voter, liveness check information and evaluating the liveness check information to determine whether the liveness check is valid or invalid, or (ii) by the election office system from the first APS which has evaluated liveness check information received from the voter, a determination by the first APS as to whether the liveness check is valid or invalid;

granting the request from the voter, by the election office system, to provide the voting ballot to the voter when the identity of the voter is verified and when the liveness check is valid; and denying the request, by the election office system, to provide the voting ballot to the voter when the identity of the voter is not verified or when the liveness check is invalid.

10. The method of claim 1, further comprising:

receiving input from the voter device to complete the voting ballot electronically.

11. The method of claim 1, further comprising:

obtaining biometric information, by the election office system, from the voter;

wherein the identity of the voter is verified when biometric information included in the verified part or all of voter ID information included in the first MIC matches biometric information obtained from the voter by the election office system; and wherein granting the request from the voter to provide the voting ballot to the voter comprises allowing the voter to access the voting ballot electronically via a user interface with the election office system, and receiving input from the voter, via the user interface, to complete the voting ballot electronically.

12. The method of claim 1, wherein the first APS is operated by a first authorizing party which is a different entity from the election office.

13. The method of claim 1, wherein the first MIC is structured to securely and discretely store various fields comprising at least one of biographic information or biometric information of the voter.

14. The method of claim 1, wherein the first MIC comprises a mobile driver's license (mDL).

15. The method of claim 1, wherein electronically provisioning the first MIC onto the voter device by the first APS comprises:

authenticating an identity of the voter to provide the first MIC which is valid and authentic;

verifying the voter ID information included in the first MIC;

authenticating the voter device as a proper voter device belonging to the voter; and copying the first MIC to the voter device.

16. The method of claim 1, wherein electronically provisioning the first MIC onto the voter device by the first APS comprises:

securely provisioning the first MIC onto the voter device.

17. An election office system for processing a request for a voting ballot for an election from a voter device of a voter, the election office system comprising a computer programmed to:

receive, by the election office system from the voter device, a request for the voting ballot for the election, part or all of voter ID information associated with a first mobile identification credential (MIC) which includes the voter ID information, wherein a first authorizing party system (a first APS) is a separate system from the election office system and has electronically provisioned the first MIC including the voter ID information comprising at least one of biographic information or biometric information or unique information of the voter onto the voter device, and consented data indication which indicates the part or all of voter ID information that is authorized by the voter device for release by the first APS to the election office system, the first APS having verified the voter ID information before the election office system receives from the voter device the request for the voting ballot for the election, the part or all of voter ID information which has been verified by the first APS to be provided to the election office system as verified part or all of voter ID information;

use, by the election office system, the verified part or all of voter ID information included in the first MIC to verify or not verify an identity of the voter;

grant, by the election office system, the request to provide the voting ballot to the voter if the identity of the voter is verified; and deny, by the election office system, the request to provide the voting ballot to the voter if the identity of the voter is not verified.

18. The election office system of claim 17, wherein the computer is further programmed to:

receive, by the election office system from the voter device, a token as a received token specifying the part or all of voter ID information which the voter has consented to release to the election office system;

send, by the election office system to the first APS, the received token, which is to be verified by the first APS with another token sent from the voter device to the first APS;

when the tokens are received by the first APS within a preset timeframe and are verified by the first APS, receive, by the election office system from the first APS, the part or all of voter ID information as the verified part or all of voter ID information; and when the tokens are not received by the first APS within the preset timeframe or are not verified by the first APS, receive, by the election office system from the first APS, a notification to resubmit the request for ID information of the voter.

19. The election office system of claim 17, wherein the computer is further programmed to:

receive, by the election office system from the voter device, an electronic document as a received electronic document specifying the part or all of voter ID information which the voter has consented to release to the election office system;

send, by the election office system to the first APS, the received electronic document;

when the received electronic document is verified by the first APS, receive, by the election office system from the first APS, the part or all of voter ID information as the verified part or all of voter ID information; and when the received electronic document is not verified by the first APS, receive, by the election office system from the first APS, a notification to resubmit the request for ID information of the voter.

20. The election office system of claim 17, wherein the computer is further programmed to:

receive, by the election office system from voter device, an electronic document as a received electronic document and the part or all of voter ID information which the voter has consented to release to the election office system;

send, by the election office system to the first APS, the received electronic document;

when the received electronic document is verified by the first APS, receive, by the election office system from the first APS, an authentication key to verify the part or all of voter ID information received from the voter device; and when the received electronic document is not verified by the first APS, receive, by the election office system from the first APS, a notification to resubmit the request for ID information of the voter.

21. The election office system of claim 17, wherein the computer is further programmed to:

receive, by the election office system from the voter device, the part or all of voter ID information which the voter has consented to release to the election office system; and receive, by the election office system from the first APS, an authentication key to verify the part or all of voter ID information received from the voter device, based on a request sent from the voter device to the first APS.

22. The election office system of claim 17, wherein the voter ID information further comprises voter eligibility information of the voter, and wherein the computer is further programmed to:

send, by the election office system to the voter device, a request for voter eligibility information of the voter;

receive, by the election office system, part or all of the voter eligibility information included in the first MIC which the voter device received from the first APS or a second MIC which the voter device received from a second APS, wherein the voter has consented to release the part or all of voter eligibility information to the election office system, and wherein the part or all of voter eligibility information has been verified by the second APS as verified part or all of voter eligibility information before the election office system sends to the voter device the request for the voter eligibility information;

use, by the election office system, the verified part or all of voter eligibility information to verify or not verify voter eligibility of the voter;

granting the request, by the election office system, to provide the voting ballot to the voter, when the identity and the voter eligibility of the voter are verified; and denying the request, by the election office system, to provide the voting ballot to the voter, when the identity or the voter eligibility of the voter is not verified.

23. The election office system of claim 17, wherein the voting ballot requested is an electronic voting ballot, and wherein the request for the voting ballot includes a request to accept the electronic voting ballot which is completed by the voter from the voter device as a completed electronic voting ballot, and wherein the computer is further programmed to:

verify the identity of the voter before granting the request, by the election office system, to accept the completed electronic voting ballot from the voter device.

24. The election office system of claim 17, wherein the computer is further programmed to:

send, by the election office system to the voter device, a request for a liveness check;

receive, (i) by the election office system, from the voter, liveness check information and evaluate the liveness check information to determine whether the liveness check is valid or invalid, or (ii) by the election office system from the first APS which has evaluated liveness check information received from the voter, a determination by the first APS as to whether the liveness check is valid or invalid;

grant the request from the voter, by the election office system, to provide the voting ballot to the voter when the identity of the voter is verified and when the liveness check is valid; and deny the request, by the election office system, to provide the voting ballot to the voter when the identity of the voter is not verified or when the liveness check is invalid.

25. The election office system of claim 17, wherein the computer is further programmed to:

receive input from the voter device to complete the voting ballot electronically.

26. The election office system of claim 17, further comprising:

a biometric device to obtain biometric information from a user;

wherein the identity of the voter is verified when biometric information included in the verified part or all of voter ID information included in the first MIC matches biometric information obtained from the voter by the election office system; and wherein granting the request from the voter to provide the voting ballot to the voter comprises allowing the voter to access the voting ballot electronically via a user interface with the election office system, and receiving input from the voter, via the user interface, to complete the voting ballot electronically.

27. A method for a voter having a voter device to submit a completed voting ballot for an election to an election office having an election office system, the method comprising:
receiving, by the election office system from the voter device, a request to submit the completed voting ballot for the election, part or all of voter identification (ID) information associated with a first mobile identification credential (MIC) which includes the voter ID information, wherein a first authorizing party system (a first APS) is a separate system from the election office system and has electronically provisioned the first MIC including the voter ID information comprising at least one of biographic information or biometric information or unique information of the voter onto the voter device, and consented data indication which indicates part or all of voter ID information that is authorized by the voter device for release by the first APS to the election office system, the first APS having verified the voter ID information before the election office system receives from the voter device the request to submit the completed voting ballot for the election, the part or all of voter ID information which has been verified by the first APS to be provided to the election office system as verified part or all of voter ID information;
using, by the election office system, the verified part or all of voter ID information included in the first MIC, to verify or not verify an identity of the voter;
accepting, by the election office system, the completed voting ballot electronically from the voter device if the identity of the voter is verified; and
rejecting, by the election office system, the completed voting ballot electronically from the voter device if the identity of the voter is not verified.

28. The method of claim 27, further comprising:
sending, by the election office system to the voter device, an acceptance receipt for accepting the completed voting ballot after verifying the identity of the voter.

29. The method of claim 27, further comprising:
sending, by the election office system to the voter device, a submission receipt for receiving the request to submit the completed voting ballot.

30. A system for conducting an election comprising: a first authorizing party system (a first APS), a voter device of a voter, and an election office system used by an election office to process a request for a voting ballot for an election from the voter device, the election office system being a separate system from the first APS and including an election office computer programmed to perform operations according to election office instructions, the voter device including a voter computer programmed to perform operations according to voter instructions, the first APS having electronically provisioned a first mobile identification credential (MIC) including voter identification (ID) information comprising at least one of biographic information or biometric information or unique information of the voter onto the voter device, the first APS including an APS computer programmed to perform operations according to APS instructions,
the voter device sending, to the election office system, a request to provide the voting ballot to the voter;
the voter device receiving, from the voter, consent to release the part or all of the voter ID information included in the first MIC as consented part or all of voter ID information, the first APS having verified the consented part or all of voter ID information before the voter device sends to the election office system the request for the voting ballot;
(i) the voter device sending, to the election office system, the consented part or all of voter ID information, and the first APS verifying the part or all of voter ID information included in the first MIC as verified part or all of voter ID information included in the first MIC, or
(ii) the first APS sending, to the election office system, the consented part or all of voter ID information as verified part or all of voter ID information included in the first MIC;
the election office system using the verified part or all of voter ID information included in the first MIC to verify or not verify an identity of the voter;
the election office system granting the request to provide the voting ballot to the voter if the identity of the voter is verified; and
the election office system denying the request to provide the voting ballot to the voter if the identity of the voter is not verified.

* * * * *